(12) United States Patent
Aubin-Marchand et al.

(10) Patent No.: US 12,391,322 B2
(45) Date of Patent: Aug. 19, 2025

(54) SUPPORT STRUCTURE FOR CONNECTING AT LEAST ONE SUPPORT WHEEL ASSEMBLY TO A FRAME OF A TRACK SYSTEM AND TRACK SYSTEM HAVING THE SAME

(71) Applicant: SOUCY INTERNATIONAL INC., Drummondville (CA)

(72) Inventors: Jeremie Aubin-Marchand, St-Hugues (CA); Yan Roger, Drummondville (CA)

(73) Assignee: SOUCY INTERNATIONAL INC., Drummondville (CA)

( * ) Notice: Subject to any disclaimer, the term of this patent is extended or adjusted under 35 U.S.C. 154(b) by 917 days.

(21) Appl. No.: 17/477,798

(22) Filed: Sep. 17, 2021

(65) Prior Publication Data
US 2022/0089231 A1     Mar. 24, 2022

Related U.S. Application Data

(60) Provisional application No. 63/080,135, filed on Sep. 18, 2020.

(51) Int. Cl.
*B62D 55/15*     (2006.01)
(52) U.S. Cl.
CPC .................. *B62D 55/15* (2013.01)
(58) Field of Classification Search
CPC ........ B62D 55/10; B62D 55/14; B62D 55/15; B62D 55/104; B62D 55/1086
See application file for complete search history.

(56) References Cited

U.S. PATENT DOCUMENTS

| | | | |
|---|---|---|---|
| 1,506,431 A | 8/1924 | Adolphe | |
| 3,695,737 A | 10/1972 | Alexander et al. | |
| 3,913,987 A | 10/1975 | Baldwin et al. | |
| 3,974,891 A * | 8/1976 | Persson | B62D 55/0842 305/120 |
| 3,985,402 A | 10/1976 | Reinsma | |
| 4,166,511 A | 9/1979 | Stedman | |
| 4,519,654 A | 5/1985 | Satzler et al. | |
| 4,647,116 A | 3/1987 | Trask | |

(Continued)

FOREIGN PATENT DOCUMENTS

WO     2021108928 A1     6/2021

*Primary Examiner* — S. Joseph Morano
*Assistant Examiner* — Emily G. Castonguay
(74) *Attorney, Agent, or Firm* — BCF LLP

(57) ABSTRACT

A support structure having an axle and a multi-linkage assembly including first and second linkages for connecting at least one support wheel assembly to a frame member of a track system is disclosed. The first and second linkages are connectable to the frame member and the axle, and cooperatively define an imaginary pivot, which defines a pivot axis about which the axle can pivot due to the multi-linkage assembly. A support structure having an axle, at least one resilient body, and frame and axle clamping assemblies is also disclosed. The at least one resilient body, connectable to the frame member and the axle by the frame and axle clamping assemblies, defines an imaginary pivot, which defines a pivot axis. The at least one resilient body is deformable such that the axle is pivotable about the pivot axis. Track systems having the support structures and resilient assemblies are also disclosed.

19 Claims, 26 Drawing Sheets

(56) References Cited

U.S. PATENT DOCUMENTS

| | | | |
|---|---|---|---|
| 4,681,177 A * | 7/1987 | Zborowski | B62D 55/30 305/152 |
| 5,785,395 A | 7/1998 | Crabb | |
| 5,899,542 A | 5/1999 | Lykken et al. | |
| 5,899,543 A | 5/1999 | Lykken et al. | |
| 6,712,549 B2 | 3/2004 | Roth | |
| 6,739,679 B2 | 5/2004 | Ueno et al. | |
| 6,951,260 B1 | 10/2005 | Isley | |
| 7,726,749 B2 | 6/2010 | Rosenboom | |
| 8,147,007 B2 | 4/2012 | Rainer | |
| 9,440,692 B2 | 9/2016 | Vik et al. | |
| 9,452,796 B2 | 9/2016 | Franck et al. | |
| 9,457,854 B2 | 10/2016 | Van Mill et al. | |
| 9,505,454 B1 | 11/2016 | Kautsch | |
| 10,112,663 B1 | 10/2018 | Kautsch | |
| 10,137,949 B2 | 11/2018 | Kahlig | |
| 10,266,215 B2 | 4/2019 | Jean et al. | |
| 10,308,296 B2 | 6/2019 | Piens et al. | |
| 11,794,828 B2 | 10/2023 | Aubin-Marchand et al. | |
| 2012/0242142 A1 | 9/2012 | Kautsch et al. | |
| 2016/0194038 A1* | 7/2016 | Jean | B62D 55/244 305/15 |
| 2017/0274946 A1 | 9/2017 | Vik et al. | |
| 2018/0022407 A1 | 1/2018 | Lussier et al. | |
| 2024/0025496 A1 | 1/2024 | Aubin-Marchand et al. | |

\* cited by examiner

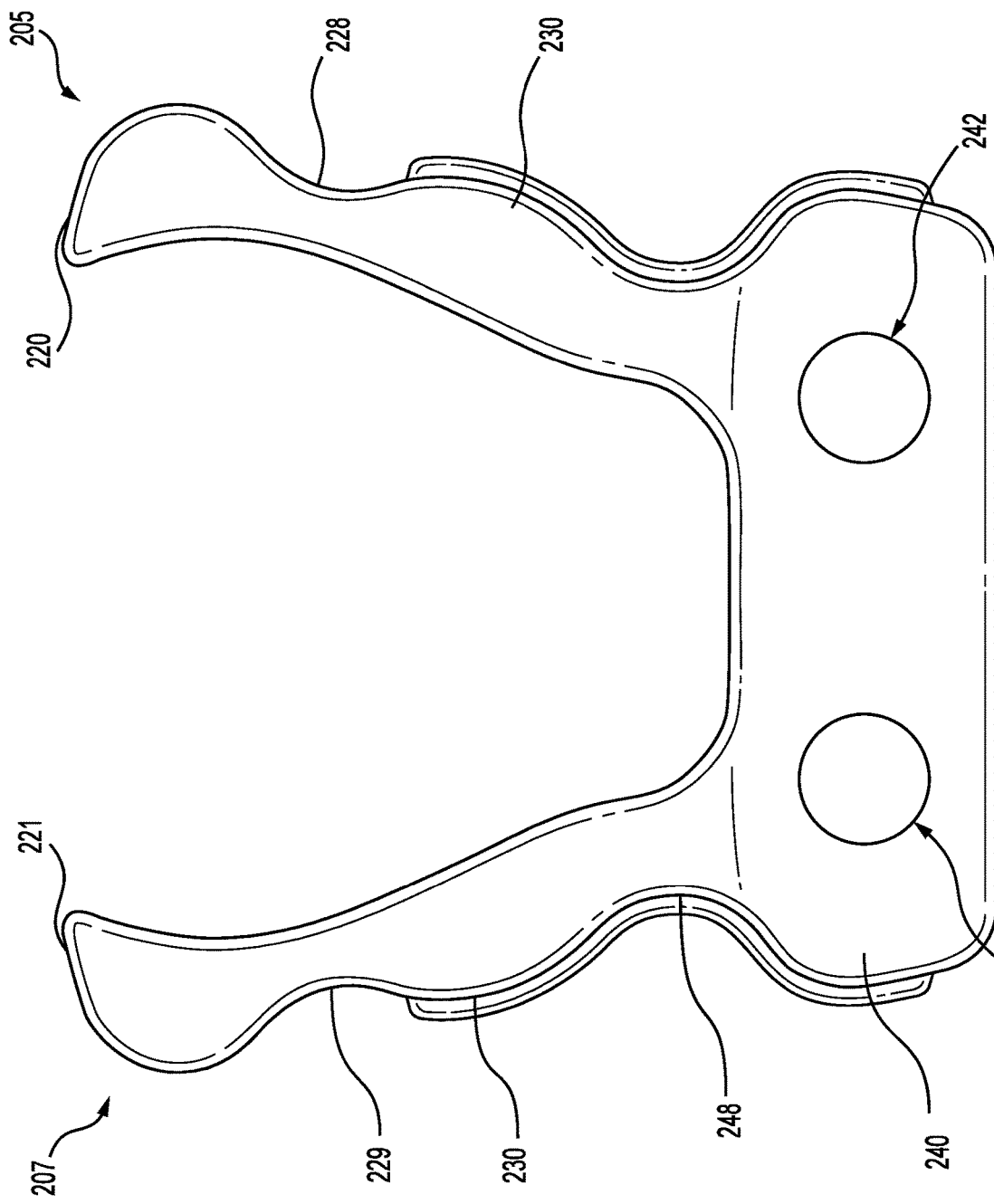

SUPPORT STRUCTURE FOR CONNECTING AT LEAST ONE SUPPORT WHEEL ASSEMBLY TO A FRAME OF A TRACK SYSTEM AND TRACK SYSTEM HAVING THE SAME

CROSS-REFERENCE TO RELATED APPLICATION

The present application claims priority to U.S. Provisional Patent Application Ser. No. 63/080,135, filed Sep. 18, 2020, entitled "Support Structure For Connecting At Least One Support Wheel Assembly To A Frame Of A Track System And Track System Having The Same", which is incorporated by reference herein in its entirety.

TECHNICAL FIELD

The present technology relates to support structures for track systems and track systems having support structures.

BACKGROUND

Certain vehicles, such as, for example, agricultural vehicles (e.g., harvesters, combines, tractors, etc.), construction vehicles (e.g., trucks, front-end loaders, etc.) and recreational vehicles (e.g., all-terrain vehicles, utility-terrain vehicles, side-by-side vehicles, etc.) are used on ground surfaces that are soft, slippery and/or uneven (e.g., soil, mud, sand, ice, snow, etc.).

Conventionally, such vehicles have had large wheels with tires on them to move the vehicle along the ground surface. Under certain conditions, such tires may have poor traction on some kinds of ground surfaces and, as these vehicles are generally heavy, the tires may compact the ground surface in an undesirable way owing to the weight of the vehicle. For example, when the vehicle is an agricultural vehicle, the tires may compact the soil in such a way as to undesirably inhibit the growth of crops. When the vehicle is a recreational vehicle, the tires may lack traction on certain terrain and in certain conditions.

In order to reduce the aforementioned drawbacks, to increase traction and to distribute the weight of the vehicle over a larger area on the ground surface, track systems were developed to be used in place of at least some of the wheels and tires on the vehicles. For example, under certain conditions, track systems enable agricultural vehicles to be used in wet field conditions as opposed to its wheeled counterpart. In other conditions, track systems enable recreational vehicles to be used in low traction terrains such as snowy roads.

Conventional track systems do, however, present some inconveniences.

When conventional track systems travel over laterally uneven surfaces, drive lugs can come into contact with wheels, which can result in premature wear of the drive lugs of the track, and/or sometimes result in detracking of the track system. Travelling over laterally uneven surface with conventional track systems can also lead to uneven load distribution across the endless track, which can result in premature wear of the endless track of the track system.

Therefore, there is a desire for a track system that could mitigate the above-mentioned issues.

SUMMARY

It is therefore an object of the present technology to ameliorate the situation with respect to at least one of the inconveniences present in the prior art.

It is also an object of the present technology to provide a support structure for connecting support wheel assemblies to a frame of the track system, and to a track system having such support structure that are improved at least in some instances as compared with some of the prior art.

The present technology relates to a support structure for a track system having support wheel assemblies including laterally spaced support wheels. The support structure has a pivoting mechanism that pivots about a relatively stationary imaginary pivot. The support structure of the present technology increases the pivotal range of motion of the support wheels without interfering with the drive lugs of the track system provided on the inner surface of the endless track. As such, the support structure aids the track system to better conform to ground irregularities, reduce wear of the endless track of the track system, improve load distribution on the track and reduce risks of detracking.

In the context of the following description, "outwardly" or "outward" means away from a longitudinal center plane of the track system, and "inwardly" or "inward" means toward the longitudinal center plane. In addition, in the context of the following description, "longitudinally" means in a direction parallel to the longitudinal center plane of the track system in a plane parallel to flat level ground, "laterally" means in a direction perpendicular to the longitudinal center plane in a plane parallel to flat level ground, and "generally vertically" means in a direction contained in the longitudinal center plane along a height direction of the track system generally perpendicular to flat level ground. Note that in the Figures, a "+" symbol is used to indicate an axis of rotation. In the context of the present technology, the term "axis" may be used to indicate an axis of rotation. Also, the terms "pivot assembly" and "wheel assemblies" include all the necessary structure (bearing structures, pins, axles and other components) to permit a structure/wheel to pivot/rotate about an axis, as the case may be. Moreover, the direction of forward travel of the track system is indicated by an arrow in FIG. 1. In the present description, the "leading" components are components located towards the front of the vehicle defined consistently with the vehicle's forward direction of travel, and the "trailing" components are components located towards the rear of the vehicle defined consistently with the vehicle's forward direction of travel. In the following description and accompanying Figures, the track system is configured to be attached to a right side of the chassis of the vehicle.

According to an aspect of the present technology, there is provided a support structure for connecting at least one support wheel assembly to a frame of a track system. The frame of the track system includes a frame member, and the track system has a longitudinal center plane. The support structure includes an axle and a multi-linkage assembly. The axle is adapted to support the at least one support wheel assembly. The axle is spaced from the frame member, and has an axle axis extending transversally to the longitudinal center plane. The multi-linkage assembly has a first linkage and a second linkage. The first linkage is connectable between the frame member and the axle, and extends on a first side of the longitudinal center plane. The second linkage is connectable between the frame member and the axle, and extends on a second side of the longitudinal center plane. The first and second linkages are adapted for allowing movement between the frame member and the axle, and for connecting the axle to the frame member of the track system such that an imaginary pivot is cooperatively defined by the first and second linkages. The imaginary pivot defines a pivot axis extending below the axle axis.

In some embodiments, the pivot axis is vertically spaced from an inner surface of an endless track of the track system within about 25% of a distance between the axle axis and the inner surface.

In some embodiments, the pivot axis is vertically aligned with the inner surface of the endless track of the track system.

In some embodiments, the pivot axis is movable laterally relative to the longitudinal center plane by less than about three millimeters.

In some embodiments, the axle is pivotable about the pivot axis within a range of motion of between about −15 and about +15 degrees.

In some embodiments, the multi-linkage assembly further includes a frame linkage connectable to the frame member. The frame linkage extends transversally to the longitudinal center plane, and the first and second linkages are pivotally connectable to the frame linkage.

In some embodiments, the first linkage has a first frame connecting portion that extends between the frame member and the axle and that is disposed on the first side of the longitudinal center plane. The second linkage has a second frame connecting portion that extends between the frame member and the axle and that is disposed on the second side of the longitudinal center plane. The first and second frame connecting portions are formed from a resilient material.

In some embodiments, the first linkage further has a first axle connecting portion extending parallel to the axle axis, and in front of the axle. The second linkage further has a second axle connecting portion extending parallel to the axle axis, and at the rear of the axle. The first and second axle connecting portions cover at least partially the axle.

In some embodiments, the first and second linkages, and the first and second axle connecting portions are formed from a resilient material.

In some embodiments, at least one of the first linkage, the first frame connecting portion and the first axle connecting portion are integral, and the second linkage, the second frame connecting portion and the second axle connecting portion are integral.

In some embodiments, the first and second linkages, the first and second frame connecting portions, and the first and second axle connecting portions are integral.

In some embodiments, the pivot axis extends parallel to the longitudinal center plane.

In another aspect of the present technology, there is provided a track system including the support structure according to the above aspect or according to the above aspect and one or more of the above embodiments.

According to another aspect of the present technology, there is provided a support structure for connecting at least one support wheel assembly to a frame of a track system. The frame of the track system includes a frame member, and the track system has a longitudinal center plane. The support structure includes an axle, a resilient assembly that includes least one resilient body, a frame clamping assembly and an axle clamping assembly. The axle is adapted for supporting the at least one support wheel assembly. The axle is vertically spaced from the frame member, and has an axle axis that extends transversally to the longitudinal center plane. The axle also has an axle plane that extends vertically and contains the axle axis. The at least one resilient body has at least one frame connecting portion, at least one axle connecting portion and at least one intermediate portion. The at least one frame connecting portion is connectable to the frame member. The at least one axle connecting portion is spaced from the at least one frame connecting portion, and is connectable to the axle. The at least one intermediate portion extends between the at least one frame connecting portion and the at least one axle connecting portion. The frame clamping assembly is adapted for clamping the frame connecting portion to the frame member. The axle clamping assembly is adapted for clamping the axle connecting portion to the axle. The resilient assembly defines an imaginary pivot. The imaginary pivot defines a pivot axis that is positioned below the axle axis, and the resilient assembly is deformable such that the axle is pivotable about the pivot axis.

In some embodiments, the pivot axis extends parallel to the longitudinal center plane.

In some embodiments, the pivot axis is vertically aligned with an inner surface of an endless track of the track system.

In some embodiments, the pivot axis is vertically spaced from the inner surface of the endless track within about 25% of a distance between the axle axis and the inner surface.

In some embodiments, the pivot axis is movable laterally relative to the longitudinal center plane by less than about three millimeters.

In some embodiments, the axle is pivotable about the pivot axis within a range of motion of between about −15 and about +15 degrees.

In some embodiments, the resilient assembly includes a first resilient body and a second resilient body.

In some embodiments, the at least one frame connecting portion includes a first frame connecting portion and a second frame connecting portion. The frame clamping assembly includes a first frame clamping member adapted to clamp the first frame connecting portion to the frame member on a first side of the longitudinal center plane, and the frame clamping assembly further includes a second frame clamping member adapted to clamp the second frame connecting portion to the frame member on a second side of the longitudinal center plane.

In some embodiments, at least one of the first frame clamping member covers at least a portion of the first frame connecting portion, and the second frame clamping member covers at least a portion of the second frame connecting portion.

In some embodiments, the at least one axle connecting portion includes a first axle connecting portion and a second axle connecting portion. The axle clamping assembly includes a first axle clamping member adapted to clamp the first axle connecting portion to the axle on a first side of the axle plane, and the axle clamping assembly further includes a second axle clamping member adapted to clamp the second axle connecting portion to the axle on a second side of the axle plane.

In some embodiments, at least one of the first axle clamping member covers at least a portion of the first axle connecting portion, and the second axle clamping member covers at least a portion of the second axle connecting portion.

In some embodiments, the at least one frame connecting portion, the at least one intermediate portion and the at least one axle connecting portion are integral.

In some embodiments, the at least one axle connecting portion covers at least partially the axle.

In another aspect of the present technology, there is provided a track system including the support structure according to the above aspect or according to the above aspect and one or more of the above embodiments.

In another aspect of the present technology, there is provided a resilient assembly comprising at least one resilient body for connecting an axle having an axle axis and a support wheel assembly to a frame member of a frame of a track system. The at least one resilient body includes at least one frame connecting portion being connectable to the frame member. The at least one resilient body further includes at least one axle connecting portion being spaced from the at least one frame connecting portion, the at least one axle connecting portion being connectable to the axle. The at least one resilient body further includes at least one intermediate portion extending between the at least one frame connecting portion and the at least one axle connecting portion. The resilient assembly defines an imaginary pivot, the imaginary pivot defining a pivot axis being positioned below the axle axis, and the resilient assembly is deformable such that the axle is pivotable about the pivot axis.

In some embodiments, the resilient assembly includes a first resilient body and a second resilient body.

In some embodiments, the at least one frame connecting portion includes a first frame connecting portion and a second frame connecting portion.

In some embodiments, the at least one axle connecting portion includes a first axle connecting portion and a second axle connecting portion.

In some embodiments, the at least one frame connecting portion, the at least one intermediate portion and the at least one axle connecting portion are integral.

In some embodiments, the at least one axle connecting portion covers at least partially the axle.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 12b is a front view of the resilient body of FIG. 12a;

DETAILED DESCRIPTION

Introduction

Figure 1:
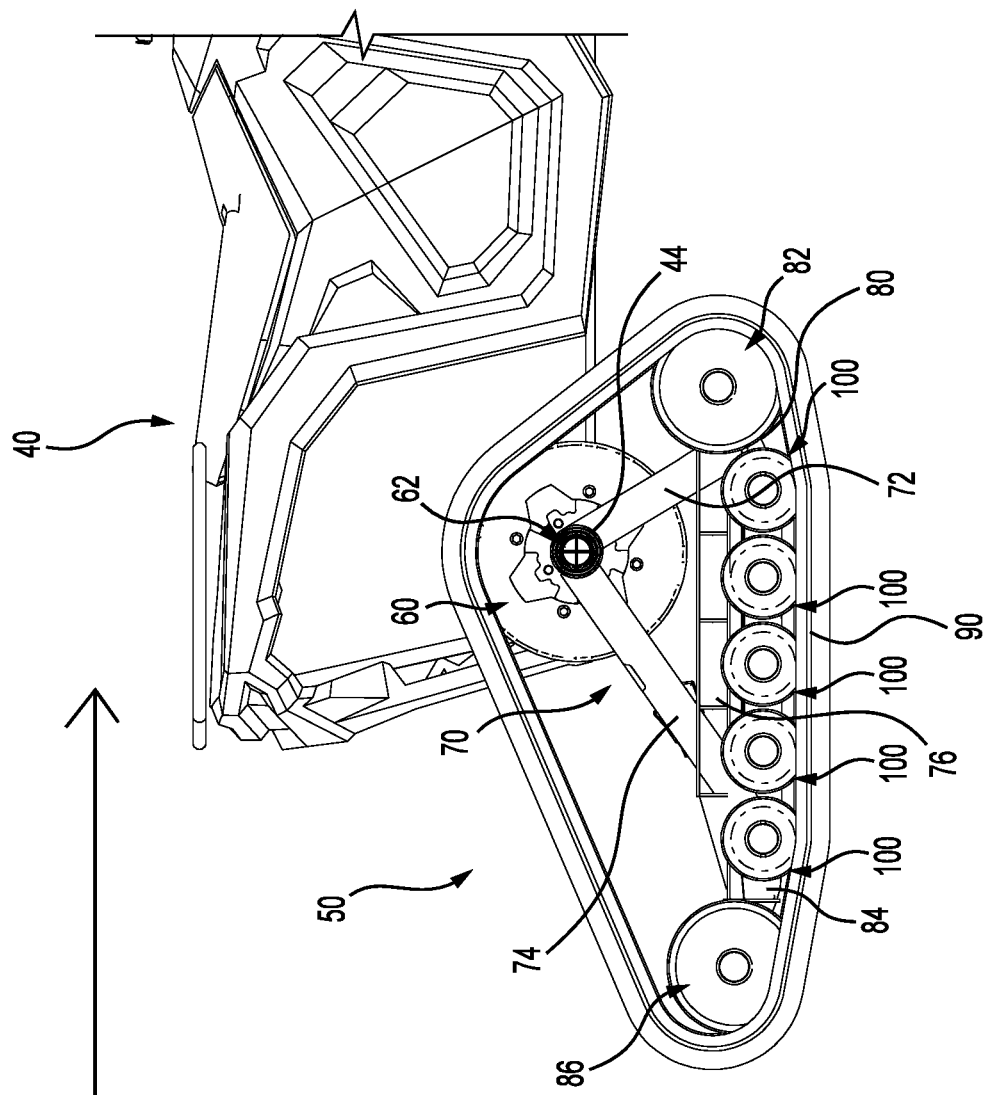
FIG. 1 is a close-up, right side elevation view of an all-terrain vehicle equipped with a rear, right track system having support structures in accordance with a first embodiment of the present technology.

As used herein, the singular form "a," "an" and "the" include plural referents unless the context clearly dictates otherwise.

The recitation herein of numerical ranges by endpoints is intended to include all numbers subsumed within that range (e.g., a recitation of 1 to 5 includes 1, 1.25, 1.5, 1.75, 2, 2.45, 2.75, 3, 3.80, 4, 4.32, and 5).

The term "about" is used herein explicitly or not. Every quantity given herein is meant to refer to the actual given value, and it is also meant to refer to the approximation to such given value that would reasonably be inferred based on the ordinary skill in the art, including equivalents and approximations due to the experimental and/or measurement conditions for such given value. For example, the term "about" in the context of a given value or range refers to a value or range that is within 20%, preferably within 15%, more preferably within 10%, more preferably within 9%, more preferably within 8%, more preferably within 7%, more preferably within 6%, and more preferably within 5% of the given value or range.

The expression "and/or" where used herein is to be taken as specific disclosure of each of the two specified features or components with or without the other. For example, "A and/or B" is to be taken as specific disclosure of each of (i) A, (ii) B and (iii) A and B, just as if each is set out individually herein. The term "or" as used herein should in general be construed non-exclusively. For example, an embodiment of "a composition comprising A or B" would typically present an aspect with a composition comprising both A and B. "Or" should, however, be construed to exclude those aspects presented that cannot be combined without contradiction.

As used herein, the term "comprise" is used in its non-limiting sense to mean that items following the word are included, but items not specifically mentioned are not excluded.

The description of the present technology, which relates to various embodiments of a support structure 100, is intended to be a description of illustrative examples of the present technology.

It is to be expressly understood that the various embodiments of the support structure 100 are merely embodiments of the present technology. Thus, the description thereof that follows is intended to be only a description of illustrative examples of the present technology. This description is not intended to define the scope or set forth the bounds of the present technology. In some cases, what are believed to be helpful examples of modifications or alternatives to support structure 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing or embodying that element of the present technology. As a person skilled in the art would understand, this is likely not the case. In addition, it is to be understood that the support structure 100 may provide in certain aspects a simple embodiment of the present technology, and that where such is the case it has been presented in this manner as an aid to understanding. As persons skilled in the art would understand, various embodiments of the present technology may be of a greater complexity than what is described herein.

General Description

Referring to FIG. 1, the present technology relates to a support structure 100 that is connectable to a track system 50. The support structure 100, which is connected to a frame member 78 of a frame 70 of the track system 50, has an axle 112 adapted for supporting a support wheel assembly 110. The support structure 100 is configured such that the axle 112 is pivotable with respect to the frame member 78 about a longitudinally extending pivot axis 182.

Different embodiments of the support structure 100 will be presented herein with reference to an all-terrain vehicle 40 shown partially in FIG. 1. As will become apparent from the description below, the support structure 100 may aid the track system 50 to improve load distribution thereof, at least in some conditions.

All-Terrain-Vehicle

Referring to FIG. 1, the track system 50 is operatively connected to the vehicle 40. The vehicle 40 is an all-terrain vehicle (ATV). It is contemplated that in alternate embodiments, the vehicle 40 could be a snowmobile, a side-by-side vehicle, a utility-terrain vehicle or another recreational vehicle. It is also contemplated that the vehicle 40 could be a harvester, a tractor, or another agricultural vehicle. Other vehicles are contemplated, and the track system 50 including the present technology is structured and configured to be used on such vehicles. Though only the rear right track system 50 is shown and described herein, the vehicle 40 includes front right, front left and rear left track systems configured to be operatively connected to their respective corners of the vehicle 40. It is contemplated that in some embodiments, the vehicle 40 could be adapted to receive more or less than four track systems 50.

Track System

Figure 2:
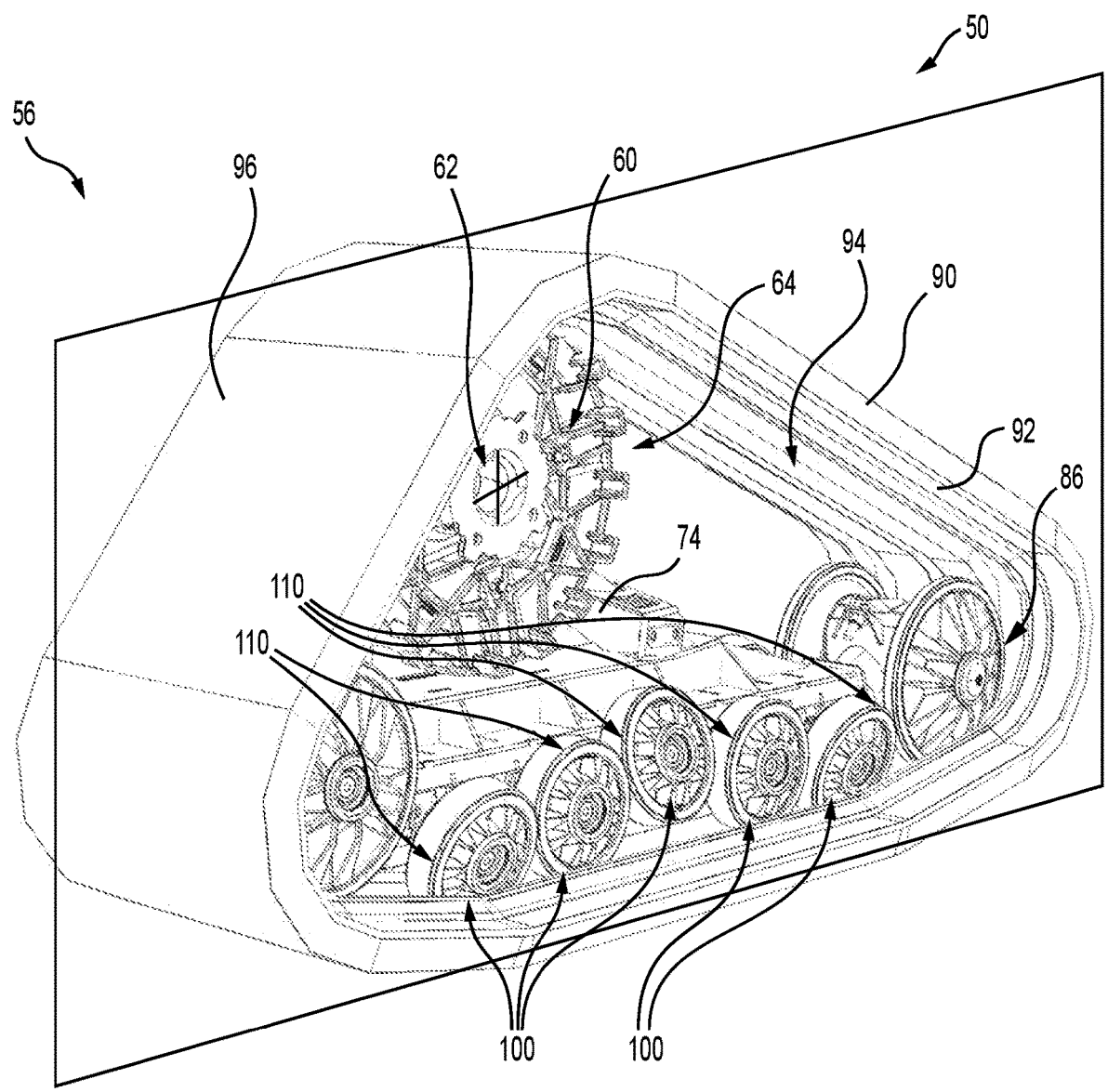
FIG. 2 is a perspective view taken from a top, front, left side of the track system of FIG. 1.

Referring to FIGS. 1 and 2, the track system 50 has a longitudinal center plane 56 that extends through a center of the track system 50. The longitudinal center plane 56 defines a left longitudinal side and a right longitudinal side. For the purpose of the following description, components that are qualified as "left" or "right" are positioned on the corresponding left longitudinal side and right longitudinal side of the track system 50, unless mentioned otherwise.

The track system 50 has a sprocket wheel assembly 60 which is operatively connected to a driving axle 44 (schematically shown in FIG. 1) of the vehicle 40. It is contemplated that in some embodiments, the sprocket wheel assembly 60 could be connected to a non-driving axle. The driving axle 44 drives the sprocket wheel assembly 60. The sprocket wheel assembly 60 can rotate about a sprocket axis 62. The sprocket axis 62 is generally perpendicular to the longitudinal center plane 56. The sprocket wheel assembly 60 defines two sets of laterally spaced recesses 64 that are spaced on the circumference of the sprocket wheel assembly 60. The two sets of laterally spaced recesses 64 are adapted, as will be described in greater detail below, to receive left and right sets of laterally spaced lugs 94 provided on an endless track 90.

The track system 50 has a frame 70. The frame 70 is positioned laterally outwardly from the sprocket wheel assembly 60. In the present embodiment, the frame 70 has a leading frame member 72, a trailing frame member 74, an intermediate frame member 76, and a frame member 78 (best seen in FIG. 6). The leading and trailing frame members 72, 74 are jointly connected around the driving axle 44. The leading frame member 72 extends longitudinally from the driving axle 44 in the forward and downward directions, and connects to a forward portion of the intermediate frame member 76. The trailing frame member 74 extends longitudinally from the driving axle 44 in the rearward and downward directions, and connects to a rearward portion of the intermediate frame member 76. In the present embodiment, the intermediate frame member 76 is generally parallel to the longitudinal center plane 56. The frame member 78 is connected to a bottom side of the intermediate frame member 76 (best seen in FIG. 6).

Still referring to FIGS. 1 and 2, the track system 50 has a leading idler linkage 80 connected to the forward portion of the intermediate frame member 76. A leading idler wheel assembly 82 is rotatably connected to the leading idler linkage 80. The track system 50 also has a trailing idler linkage 84. The trailing idler linkage 84 is connected to the rearward portion of the intermediate frame member 76. A trailing idler wheel assembly 86 is rotatably connected to the trailing idler linkage 84.

It is contemplated that in some embodiments, the leading and trailing idler linkages 80, 84 could be omitted, and that the leading and trailing idler wheel assemblies 82, 86 could be connected to the frame 70 differently. It is also contemplated that in some embodiments, the leading idler linkage 80 and/or the trailing idler linkage 84 could include a tensioner being operable to adjust tension in the endless track 90.

The track system 50 also includes five support structures 100. It is contemplated that in other embodiments, there could be more or less than five support structures 100. Each of the support structures 100 is adapted to connect a support wheel assembly 110 to the frame 70. The support structures 100 will be described in greater detail below.

The track system 50 also has the endless track 90 that extends around components of the track system 50, including the frame 70 and the leading and trailing idler and support wheel assemblies 82, 86, 110. The endless track 90 has an inner surface 92 and an outer surface 96 (FIG. 2). The inner surface 92 includes the wheel engagement surface, and has the left and right sets of laterally spaced lugs 94. The lugs 94 project from a central portion of the inner surface 92 and are engageable by the sprocket wheel assembly 60. The outer surface 96 has a tread defined thereon. It is contemplated that the tread could vary from one embodiment to another. In some embodiments, the tread could depend on the type of vehicle 40 on which the track system 50 is to be used and/or the type of ground surface on which the vehicle 40 is destined to travel. The endless track 90 is an endless polymeric track. It is contemplated that within the scope of the present technology, the endless track 90 may be constructed of a wide variety of materials and structures including metallic components known in track systems.

First Embodiment

Referring now to FIGS. 3 to 8, a first embodiment of the support structure 100, support structure 105, will be described. As previously mentioned, in the present embodiment, the track system 50 has five support structures 105. As the five support structures 105 are the same, only one support structure 105 will be described in detail.

Figure 3:
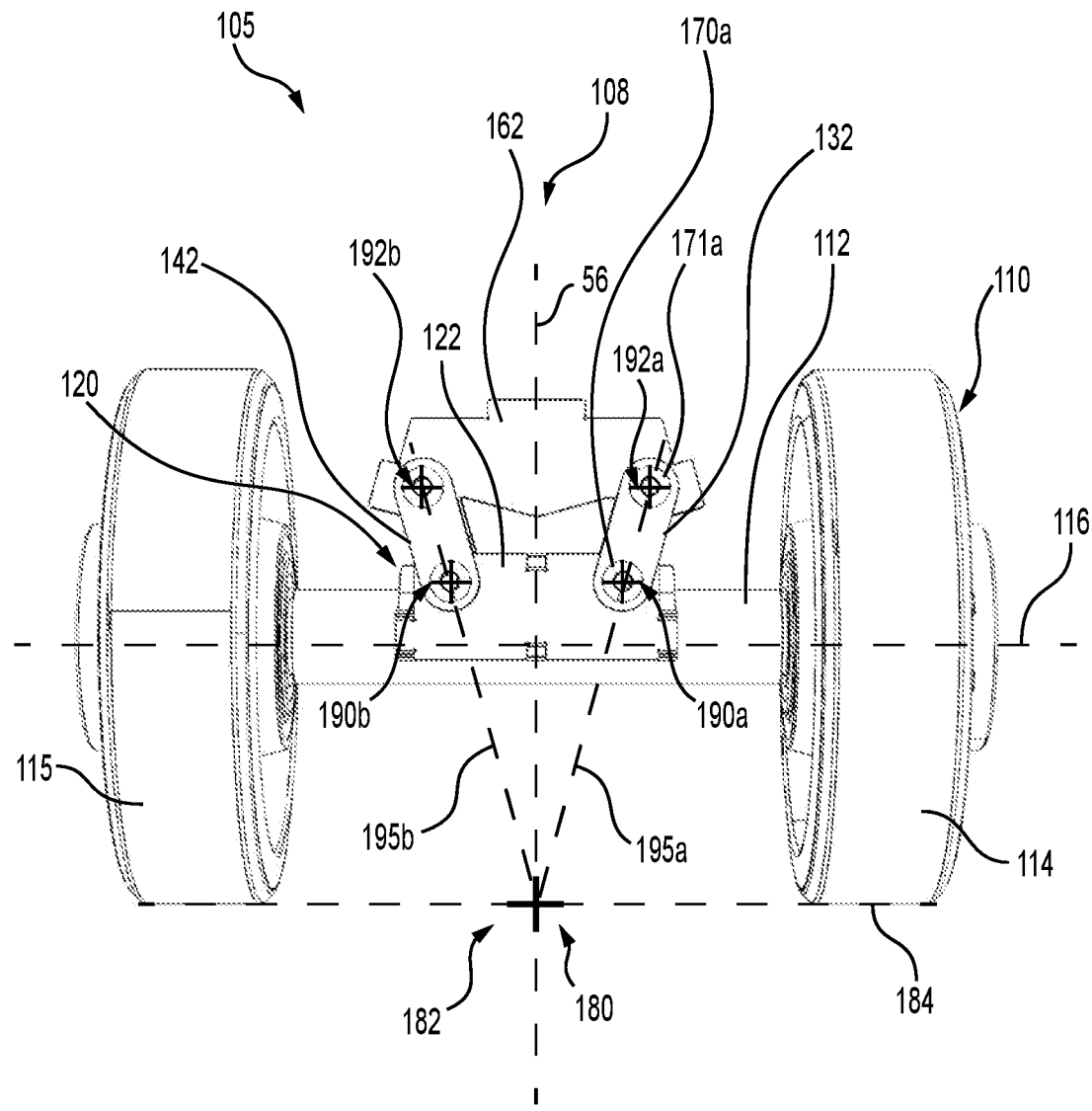
FIG. 3 is a front elevation view of one of the support structures of the track system of FIG. 1, with a support wheel assembly connected thereto.
Figure 6:
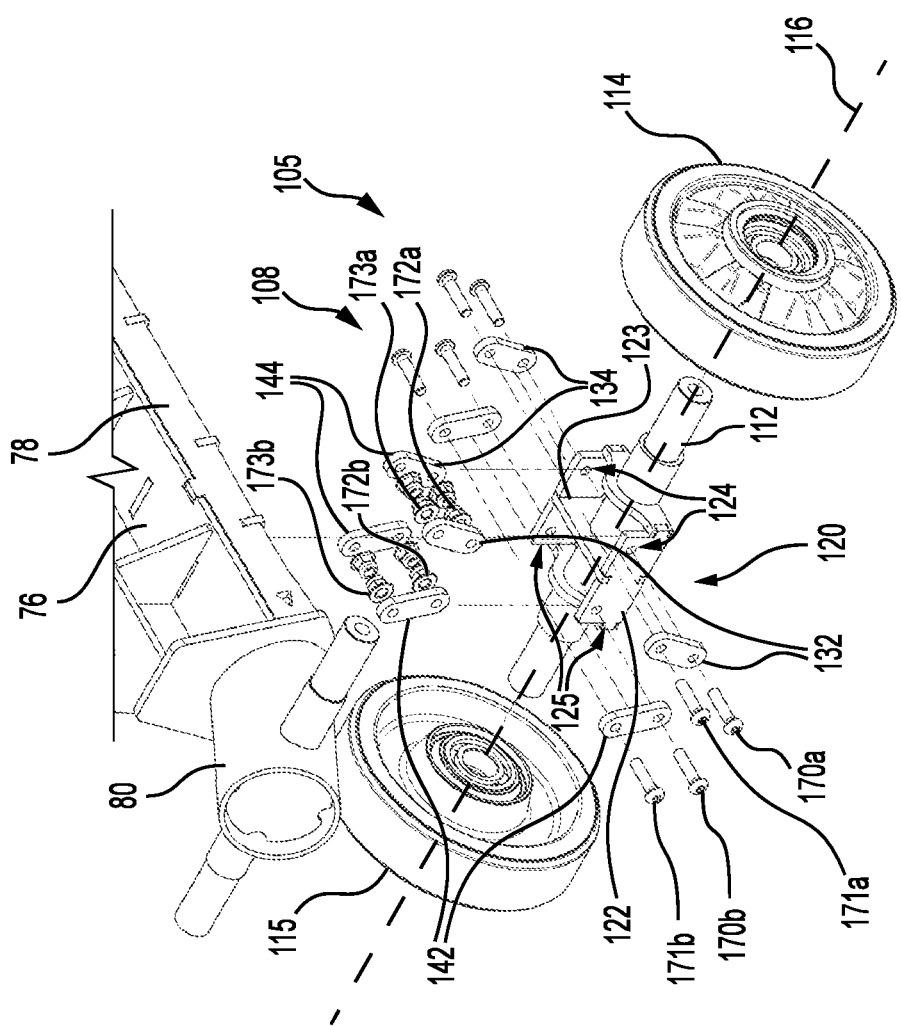
FIG. 6 is a partially exploded perspective view taken from a front, top, left side of the support structure of FIG. 3, with the support wheel assembly and a portion of the frame member.

Referring to FIG. 3, the support structure 105 has the axle 112 that is adapted to support the support wheel assembly 110. The axle 112 is positioned below the frame member 78 (FIG. 6). Thus, the axle 112 is spaced from the frame member 78. The axle 112 has an axle axis 116 that extends generally transversally to the longitudinal center plane 56. Therefore, the axle 112 also extends generally transversally to the longitudinal center plane 56.

The support wheel assembly 110 connected to the axle 112 includes the left and right support wheels 114, 115. The left and right support wheels 114, 115 are rotatably connected to the axle 112. In the present embodiment, the left and right support wheels 114, 115 each have a diameter of 144 millimetres (5.67 in). It is contemplated that in other embodiments, the left and right support wheels 114, 115 could be sized differently. For instance, the diameter of the support wheels 114, 115 could range from 129 millimetres (5.08 in) to 159 millimetres (6.26 in). It is contemplated that in some embodiments, there could be a support wheel bogie or a tandem support wheel assembly connected to the axle 112. It is contemplated that in such embodiments, the support wheel bogie or the tandem support wheel assembly could have two or more wheels connected thereto. It is also contemplated that in some embodiments, the support wheel bogie or the tandem support wheel assembly could be rotatable about the axle 112.

Figure 4:
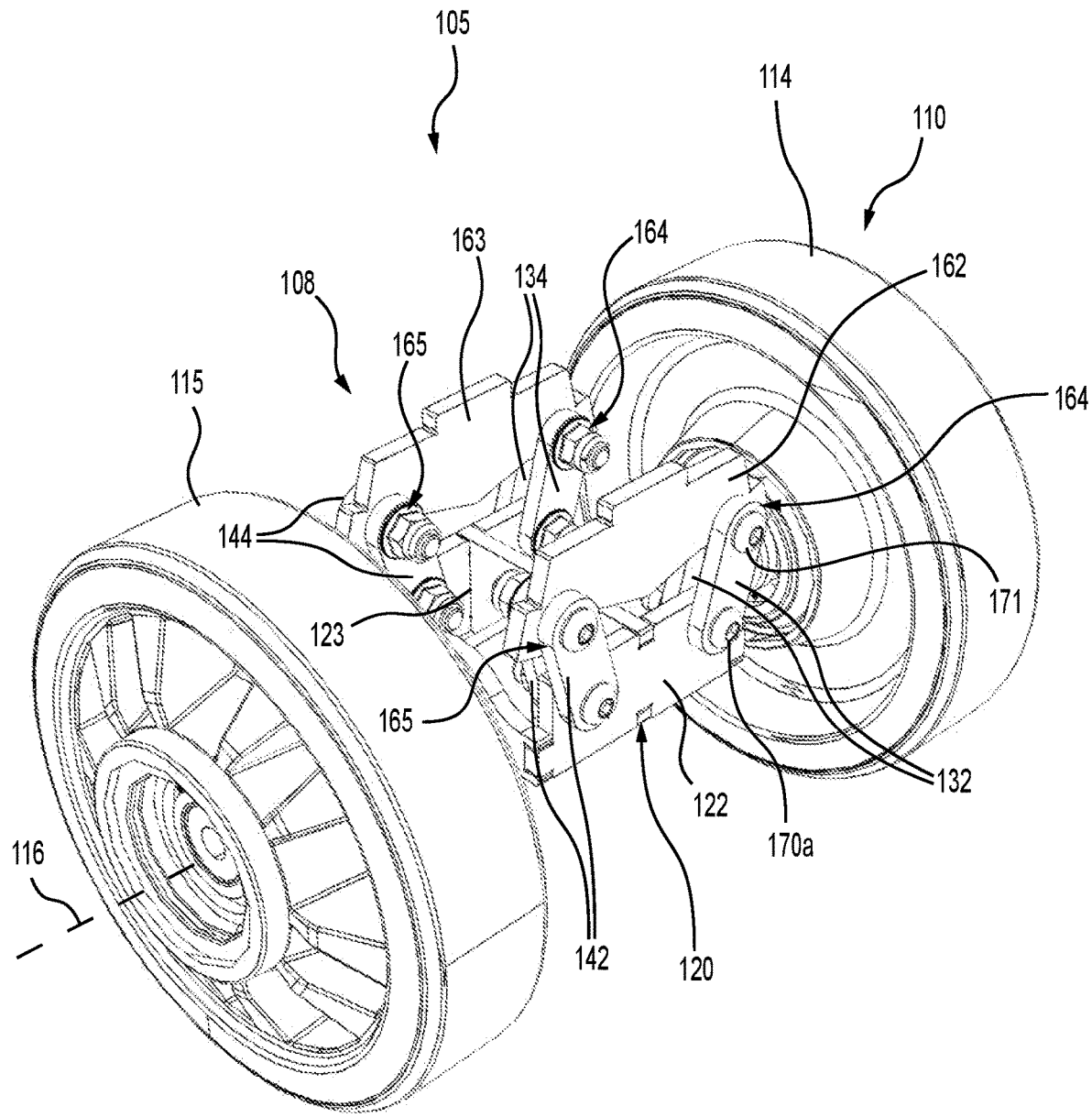
FIG. 4 is a perspective view taken from a top, front, right side of the support structure of FIG. 3.
Figure 5:
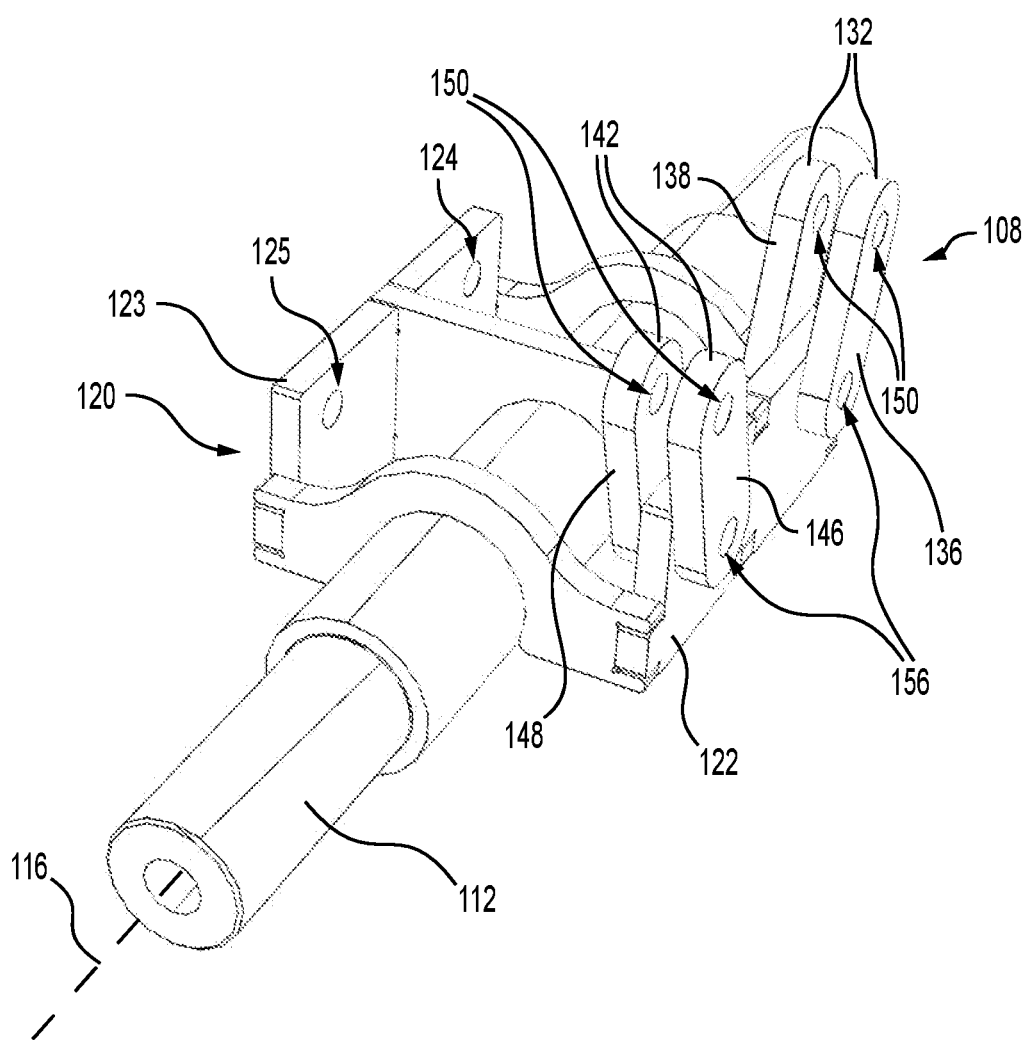
FIG. 5 is a perspective view taken from a top, front, right side of an axle, an axle linkage and linkages of the support structure of FIG. 3.

Referring now to FIGS. 4 and 5, the support structure 105 has a multi-linkage assembly 108. The multi-linkage assembly 108 includes an axle linkage 120, two leading left linkages 132, two trailing left linkages 134, two leading right linkages 142, two trailing right linkages 144, a leading frame linkage 162 and a trailing frame linkage 163. As will be described below, in the present embodiment, the leading and trailing left and right linkages 132, 134, 142, 144 are indirectly connectable to the frame member 78 and the axle 112. In the present embodiment, the leading left and right linkages 132, 142 are pivotally connected to the axle linkage 120 and to the leading frame linkage 162, and the trailing left and right linkages 134, 144 are pivotally connected to the axle linkage 120 and to the trailing frame linkage 163.

The axle linkage 120 is connected to the axle 112. In the present embodiment, the axle linkage 120 is connected to the axle 112 such that the axle 112 is rotatably fixed relative to the axle linkage 120. It is contemplated that in some embodiments, the axle linkage 120 could be rotatably connected to the axle 112. The axle linkage 120 has a leading axle linkage member 122 and a trailing axle linkage member 123. The leading and trailing axle linkage members 122, 123 are generally parallel to the axle axis 116, and thus, are generally transversal to the longitudinal center plane 56. The leading and trailing axle linkage members 122, 123 each define a left aperture 124 and a right aperture 125. As will be described below, the leading and trailing left and right linkages 132, 134, 142, 144 are connected to the axle 112 by the leading and trailing axle linkage members 122, 123. It is contemplated that in some embodiments, the axle linkage 120 could be omitted. In such embodiments, the leading and trailing left and right linkages 132, 134, 142, 144 could directly be connected to the axle 112.

Referring to FIG. 6, as mentioned above, the multi-linkage assembly 108 also includes the leading and trailing left and right linkages 132, 134, 142, 144. It is contemplated that in some embodiments, there could be more or less than two leading and trailing left and right linkages 132, 134, 142, 144. It is also contemplated that in some embodiments, there could be only two linkages: a left linkage and a right linkage. As the leading and trailing left and right linkages 132, 134, 142, 144 are similar, only the leading left and right linkages 132, 142 will be described.

Referring to FIGS. 5 and 6, as mentioned above, there are two leading left linkages 132: linkage 136 and linkage 138. As previously mentioned, it is contemplated that there could be only one leading left linkage 132. The linkages 136, 138 extend on the left side of the longitudinal center plane 56. There are also two leading right linkages 142: linkage 146 and linkage 148. As previously mentioned, it is contemplated that there could be only one leading right linkage 142. The linkages 146, 148 extend on the right side of the longitudinal center plane 56. Each of the linkages 136, 138, 146, 148 defines an upper aperture 150 and a lower aperture 156 on the upper and lower ends, respectively, of the linkages 136, 148, 146, 148.

In the present embodiment, the multi-linkage assembly 108 also has the leading and trailing frame linkages 162, 163 (best seen in FIG. 4) that are connectable to the frame member 78. It is contemplated that in some embodiments, there could be more or less than two frame linkages 162, 163. In the present embodiment, the leading and trailing frame linkages 162, 163 extend generally transversally to the longitudinal center plane 56. The leading and trailing frame linkages 162, 163 each define a left aperture 164 and a right aperture 165. It is contemplated that in some embodiments, the leading and trailing frame linkages 162, 163 could be omitted. In such embodiments, the leading and trailing left and right linkages 132, 134, 142, 144 could directly be connected to the frame member 78.

The connection of the multi-linkage assembly 108 will now be described. In the present embodiment, the leading frame linkage 162 is longitudinally aligned with the leading axle linkage member 122. The left and right apertures 164, 165 of the leading frame linkage 162 are, respectively, laterally offset from the left and right apertures 124, 125 of the leading axle linkage member 122. More precisely, the left and right apertures 164, 165 are laterally further from the longitudinal center plane 56 than the left and right apertures 124, 125. Likewise, the trailing frame linkage 163 is longitudinally aligned with the trailing axle linkage member 123. The left and right apertures 164, 165 of the trailing frame linkage 163 are, respectively, laterally offset from the left and right apertures 124, 125 of the trailing axle linkage member 123. More precisely, the left and right apertures 164, 165 are laterally further from the longitudinal center plane 56 than the left and right apertures 124, 125.

As the leading and trailing left and right linkages 132, 134, 142, 144 are connected similarly, only the connection of the leading left and right linkages 132, 142 will be described.

The left aperture 124 of the leading axle linkage member 122 is coaxial to the lower apertures 156 of the linkages 136, 138. Together, the left aperture 124 and the lower apertures 156 define a lower left axis 190$a$. A bolt 170$a$ is received in the lower aperture 156 of the linkage 136, in the left aperture 124 of the leading axle linkage member 122, and in the lower aperture 156 of the linkage 138. A nut 172$a$ is fastened to a part of the bolt 170$a$ extending through the left aperture 124 and the lower apertures 156, thereby pivotally connecting the linkages 136, 138 to the axle linkage 120.

Likewise, the left aperture 164 of the leading frame linkage 162 is coaxial to the upper apertures 150 of the linkages 136, 138. Together, the left aperture 164 and the upper apertures 150 define an upper left axis 192$a$. A bolt 171$a$ is received in the upper aperture 150 of the linkage 136, in the left aperture 164 of the leading frame linkage 162, and in the upper aperture 150 of the linkage 138. A nut 173$a$ is fastened to a part of the bolt 171$a$ extending through the left aperture 164 and the upper apertures 150, thereby pivotally connecting the linkages 136, 138 to the leading frame linkage 162.

Due to the lateral offset between the left aperture 124 and the left aperture 164, the linkages 136, 138 are oriented at an angle from the longitudinal center plane 56, such that the lower end of each of the linkages 136, 138 are closer to the longitudinal center plane 56 than the upper end of each of the linkages 136, 138.

In a similar fashion, the right aperture 125 of the leading axle linkage member 122 is coaxial to the lower apertures 156 of the linkages 146, 148. Together, the right aperture 125 and the lower apertures 156 define a lower right axis 190$b$. A bolt 170$b$ is received in the lower aperture 156 of the linkage 146, in the right aperture 125 of the leading axle linkage member 122, and in the lower aperture 156 of the linkage 148. A nut 172$b$ is fastened to a part of the bolt 170$b$ extending through the right aperture 125 and the lower apertures 156, thereby pivotally connecting the linkages 146, 148 to the axle linkage 120.

Likewise, the right aperture 165 of the leading frame linkage 162 is coaxial to the upper apertures 150 of the linkages 146, 148. Together, the right aperture 165 and the upper apertures 150 define an upper right axis 192$b$. A bolt 171$b$ is received in the upper aperture 150 of the linkage 146, in the right aperture 165 of the leading frame linkage 162, and the upper aperture 150 of the linkage 148. A nut 173$b$ is fastened to a part of the bolt 171$b$ extending through the right aperture 165 and the upper apertures 150, thereby pivotally connecting linkages 146, 148 to the leading frame linkage 162.

Due to the lateral offset between the right aperture 125 and the right aperture 165, the linkages 146, 148 are oriented at an angle from the longitudinal center plane 56, such that the lower end of each of the linkages 146, 148 are closer to the longitudinal center plane 56 than the upper end of each of the linkages 146, 148.

The trailing left and right linkages 134, 144 are connected to the trailing axle linkage member 123 similarly, and therefore their connection will not be described.

Figure 7A:
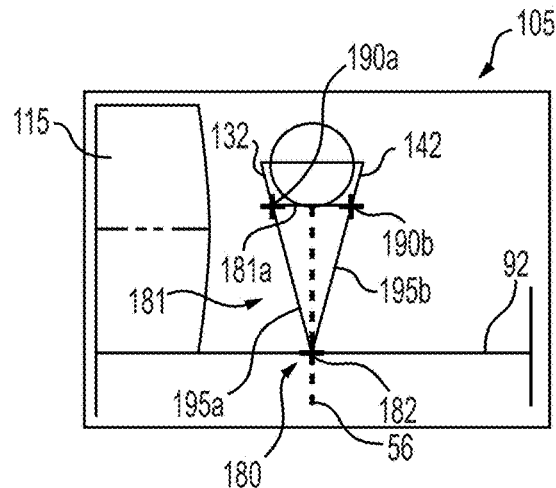
FIG. 7a is a schematic illustration of the support structure of FIG. 3 being at an initial position.

Referring to FIGS. 3 and 7a to 7d, the leading left and right linkages 132, 142 (together with the linkages 134, 144, 136, 146, 138, 148) are positioned to cooperatively define an imaginary pivot 180. More specifically, as the leading left and right linkages 132, 142 are found at an angle with respect to the longitudinal center plane 56, left and right imaginary projections 195a, 195b eventually intersect at the imaginary pivot 180 when the support structure 105 is in an initial position (FIG. 7a). The left projection 195a passes through the upper and lower left axes 190a, 192a, and the right projection 195b passes through the upper and lower right axes 190b, 192b. The point of intersection between the left and right projections 195a, 195b is the imaginary pivot 180 when the support structure 105 is in the initial position (FIG. 7a). The imaginary pivot 180 is the lower apex of an imaginary triangle 181 (FIG. 7a) defined by the left projection 195a, the right projection 195b, and an imaginary line 181a passing through the lower axes 190a, 190b when the support structure 105 is in the initial position. The imaginary pivot 180 is said to be "cooperatively defined" by the left and right linkages 132, 142 because the imaginary pivot 180 corresponds to the pivot that results from the cooperation of the left and right linkages 132, 142 being pivotally connected as described above, and being found at an angle with respect to the longitudinal center plane 56. In other words, the imaginary pivot 180 corresponds to the pivot that would be defined by a real pivoting structure supporting the axle 112 located below the axle axis 116, which cannot be the case in the present track system 50 due to the presence of the lugs 94 on the inner surface 92 of the endless track 90.

As shown in FIG. 3, when the support structure 105 is in the initial position, the imaginary pivot 180 defines a pivot axis 182 that is laterally aligned with the longitudinal center plane 56. The pivot axis 182 extends below the axle axis 116, parallel to the longitudinal center plane 56. As briefly described above, and described in more detail below, maintaining the imaginary pivot 180, and thus, the pivot axis 182, within the disclosed vertical range could help reduce wear of the endless track 90 at least in some conditions. Maintaining the imaginary pivot 180 and the pivot axis 182 within a certain lateral range, as described in greater detail below, could also help reduce wear of the endless track 90.

The multi-linkage assembly 108 is configured such that the imaginary pivot 180, and thus the pivot axis 182, is relatively stationary relative to the longitudinal center plane 56. In typical conditions, the imaginary pivot 180, and thus the pivot axis 182, is contained in the longitudinal center plane 56. However, it is contemplated that in some embodiments, the imaginary pivot 180 could be displaced laterally.

In the present embodiment, the imaginary pivot 180 and the pivot axis 182 is vertically aligned with the bottommost portion of the left and right support wheels 114, 115, which engage the inner surface 92 of the endless track 90. In other words, the pivot axis 182 is contained in a plane 184 (FIG. 3) defined by the bottommost portion of the left and right support wheels 114, 115. It is contemplated that in some embodiments, the imaginary pivot 180 and the pivot axis 182 could be vertically spaced upwardly from the plane 184 within about 25% of a distance between the axle axis 116 and the plane 184. As the vertical position of the imaginary pivot 180 increases, the support structure 105 becomes more unstable. In yet other embodiments, the imaginary pivot 180 and the pivot axis 182 could be vertically spaced downwardly from the plane 184 within about 25% of the distance between the axle axis 116 and the plane 184. As the vertical position of the imaginary pivot 180 decreases, imaginary pivot 180 is more likely to move laterally.

Similarly, the trailing left and right linkages 134, 144 also define an imaginary pivot and a pivot axis that is laterally and vertically aligned with the imaginary pivot 180 and the pivot axis 182.

The multi-linkage assembly 108, and the leading left and right linkages 132, 142 are adapted to allow movement between the axle 112 and the frame member 78. More precisely, the multi-linkage assembly 108, and the leading left and right linkages 132, 142 are configured such that the axle 112 is pivotable about the pivot axis 182 within a range of motion of about fifteen degrees in clockwise or counterclockwise directions. It is contemplated that in some embodiments, the range of motion could be less than fifteen degrees.

Figure 7B:
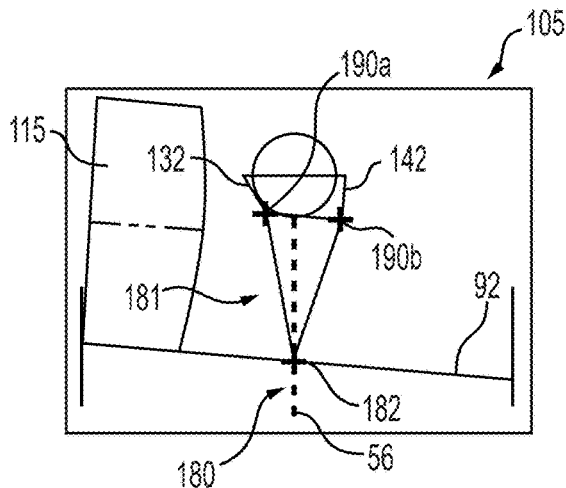
FIG. 7b is a schematic illustration of the support structure of FIG. 3 being pivoted at five degrees in a clockwise direction.
Figure 7C:
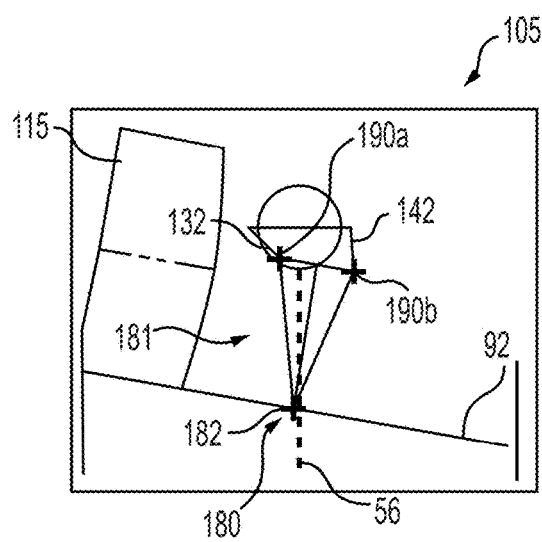
FIG. 7c is a schematic illustration of the support structure of FIG. 3 being pivoted at ten degrees in the clockwise direction.
Figure 7D:
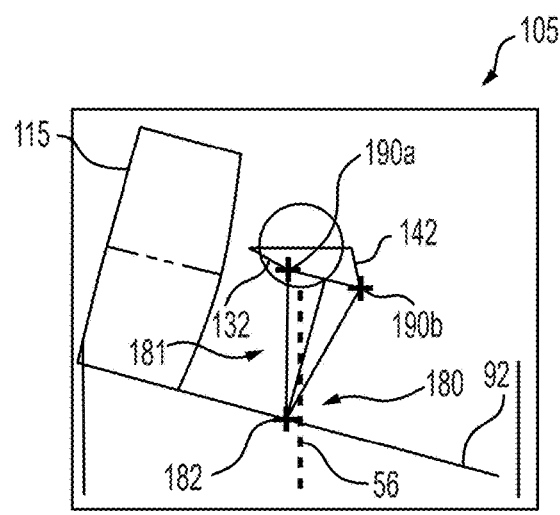
FIG. 7d is a schematic illustration of the support structure of FIG. 3 being pivoted at fifteen degrees in the clockwise direction.

In the present embodiment, when the leading left and right linkages 132, 142 move such that the axle 112 pivots about the pivot axis 182, the pivot axis 182 remains stationary relative to the longitudinal center plane 56. In some embodiments, the imaginary pivot 180 could move laterally relative to the longitudinal center plane 56 as the leading left and right linkages 132, 142 move. In such embodiments, it is contemplated that the imaginary pivot 180 could move laterally by up to about three millimetres (0.12 in), when the axle 112 pivots about fifteen degrees about the pivot axis 182. As can be seen in FIGS. 7b to 7d, when the imaginary triangle 181 moves together with the linkages 132, 142, the imaginary pivot 180 remains in close proximity with the longitudinal center plane 56, i.e. the imaginary pivot 180 moves laterally by up to about three millimetres (0.12 in), when the axle 112 pivots about fifteen degrees about the pivot axis 182. In some track systems known in the prior art, the lateral displacement of a support structure of track system that pivots fifteen degrees could reach about twelve millimetres (0.47 in). The larger the lateral displacement is, the more likely it is that the support wheels 114, 115 could come into contact with the lugs 94, thereby increasing wear.

Therefore, when a track system 50 encounters an obstacle, or uneven terrain, on either of its left and right sides, the support structure 105 is adapted to allow the support wheels 114, 115 and the endless track 90 to better conform to the obstacle or the uneven terrain. More precisely, the leading and trailing left and right linkages 132, 134, 142, 144 pivot such that the axle 112 can pivot, allowing the left and right support wheels 114, 115 to pivot, while reducing the interference of the left and right support wheels 114, 115 with the lugs 94, and thus reducing wear of the endless track 90.

Description of the Pivoting Mechanism

Figure 8:
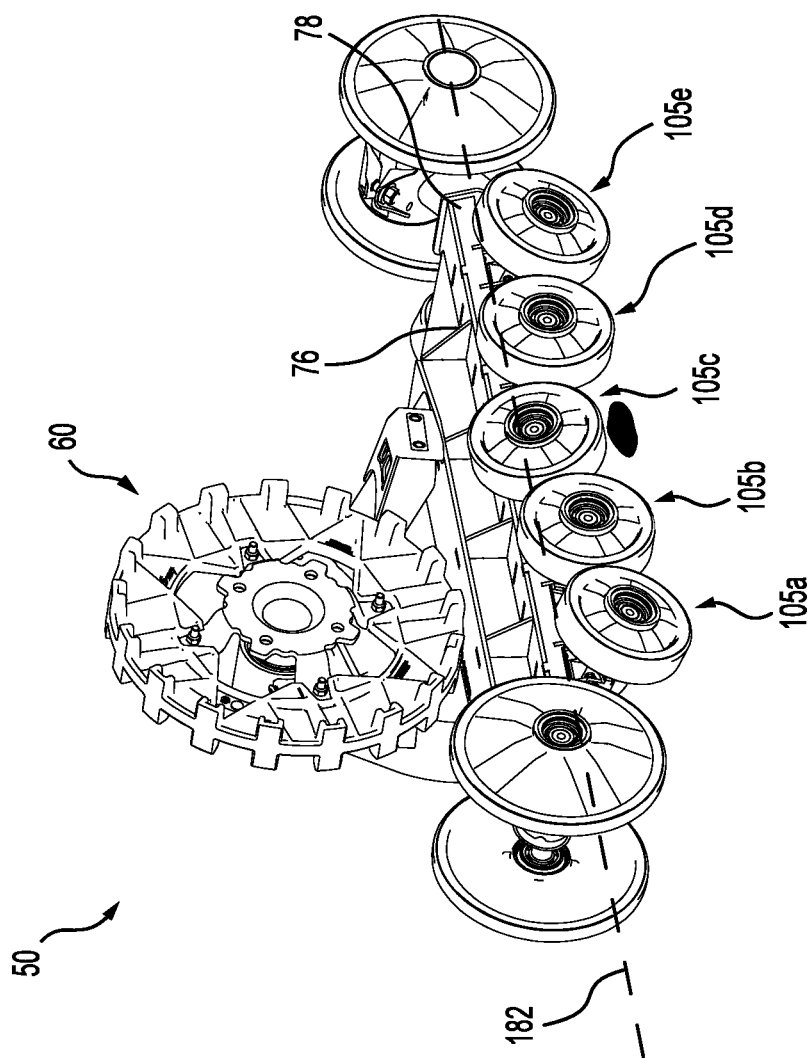
FIG. 8 is perspective view taken from a top, front, left side of the track system of FIG. 1, with an endless track being omitted, and the support structures of the track system of FIG. 1 overcoming obstacles.
Figure 9:
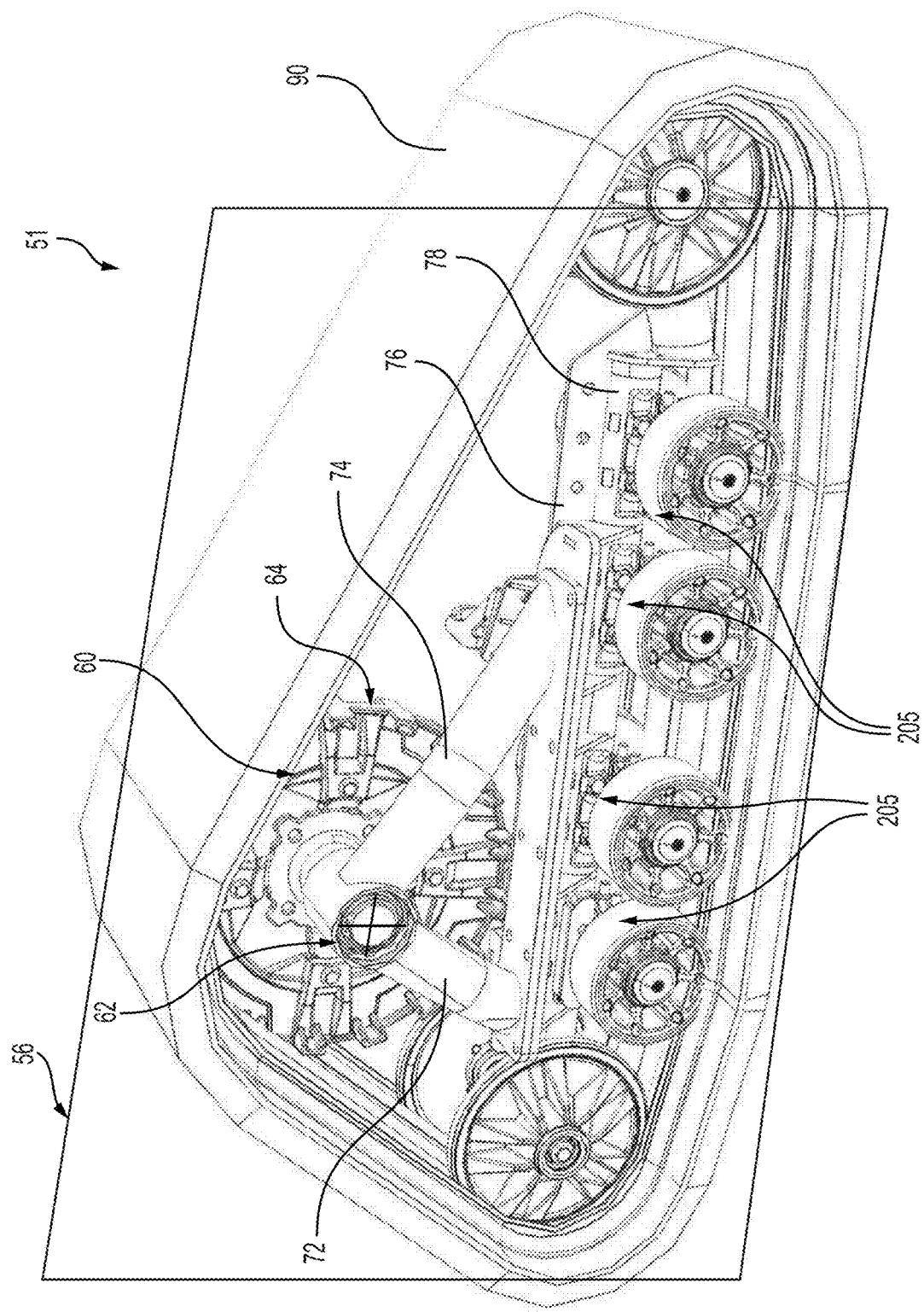
FIG. 9 is a perspective view taken from a top, rear, left side of a rear left track system having support structures in accordance with a second embodiment of the present technology.

Referring now to FIGS. 7a to 8, the track system 50 and the support structure 105 will be described as the track system 50 and the support structure 105 overcome obstacles of varying sizes.

Referring to FIG. 7a, the support structure 105 is shown on a flat, level surface. The support structure 105 is in the initial position. As mentioned above, when the support structure 105 is positioned on a flat surface, the pivot axis 182 is vertically aligned with the inner surface 92 of the endless track 90, and laterally aligned with the longitudinal center plane 56. When the support structure 105 is in the initial position, the axle 112 is not pivoted about the pivot axis 182.

Referring to FIG. 8, support structure 105b and support structure 105d are shown positioned on a flat, level surface.

Referring to FIG. 7b, the support structure 105 has encountered an obstacle such that the right support wheel 115 is elevated with respect to the left support wheel 114. The leading and trailing left and right linkages 132, 134, 142, 144 have pivoted with respect to the leading and trailing frame linkage 162, 163 and the axle linkage 120 such that the axle 112 has pivoted about the pivot axis 182 by five degrees (in the clockwise direction in FIG. 7b), thereby allowing the right support wheel 115 and the corresponding portion of the endless track 90 to better conform to the obstacle. The imaginary pivot 180, and thus the pivot axis 182, is still laterally aligned with the longitudinal center plane 56. In other words, the pivot axis 182 is still contained in the longitudinal center plane 56.

Referring to FIG. 7c, the support structure 105 has encountered an obstacle such that the right support wheel 115 is elevated with respect to the left support wheel 114. The leading and trailing left and right linkages 132, 134, 142, 144 have pivoted with respect to the leading and trailing frame linkage 162, 163 and the axle linkage 120 such that the axle 112 has pivoted about the pivot axis 182 by ten degrees (in the clockwise direction in FIG. 7c). The pivot axis 182 has moved laterally to the right by one millimetre (0.039 in), such that the pivot axis 182 is no longer laterally aligned with the longitudinal center plane 56. It is contemplated that in some embodiments, the imaginary pivot 180, and thus the pivot axis 182, could move less than one millimetre (0.039 in). It is also contemplated that in some embodiments, the imaginary pivot 180, and thus the pivot axis 182, could still be laterally aligned with the longitudinal center plane 56. In the present embodiment, the lateral movement does not cause the left and/or right support wheels 114, 115 to interfere with the lugs 94.

Referring to FIG. 7d, the support structure 105 has encountered an obstacle such that the right support wheel 115 is elevated with respect to the left support wheel 114. The leading and trailing left and right linkages 132, 134, 142, 144 have pivoted with respect to the leading and trailing frame linkage 162, 163 and the axle linkage 120 such that the axle 112 has pivoted about the pivot axis 182 by fifteen degrees (in the clockwise direction in FIG. 7d). The pivot axis 182 has moved laterally to the right by three millimetres (0.12 inch). It is contemplated that in some embodiments, the imaginary pivot 180, and thus the pivot axis 182, could move less than three millimetres (0.12 inch). It is also contemplated that in some embodiments, the imaginary pivot 180, and thus the pivot axis 182, could still be laterally aligned with the longitudinal center plane 56. In the present embodiment, the lateral movement does not cause the left and/or right support wheels 114, 115 to interfere with the lugs 94.

Referring to FIG. 8, support structure 105a and support structure 105e have pivoted about the pivot axis 182 by fifteen degrees in the clockwise direction, while support structure 105c has pivoted about the pivot axis 182 by fifteen degrees in the counter-clockwise direction.

Figure 25:
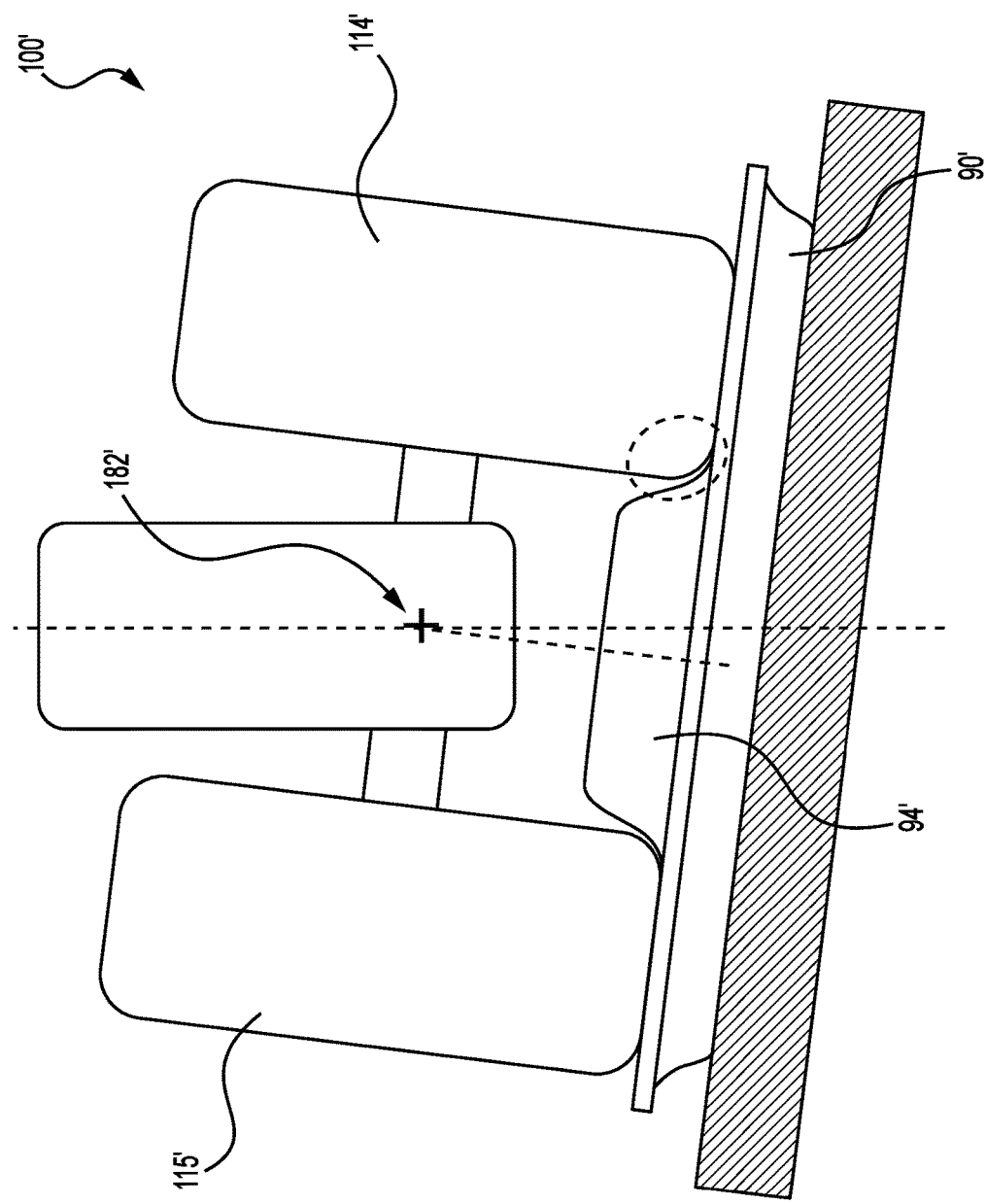
FIG. 25 is a schematic, front elevation view of a support structure for connecting a support wheel assembly to a frame of a track system in accordance with a technology being part of the prior art.

As indicated above, reducing the lateral movement of the pivot axis 182 with respect to the longitudinal center plane 56 may assist in reducing wear of the lugs 94 in some conditions. Indeed, as shown in FIG. 25, in track systems having a support structure known as prior art, when the support structure 100' pivots about the pivot axis 182', the inner side of the left support wheel 114' could come into contact with the drive lug 94'. The left support wheel 114' applies lateral forces to the drive lug 94', and thus friction occurs in the region identified by a dotted oval in FIG. 25. Friction causes premature wear of the lugs 94'. The lateral forces applied by the support wheel 114' can also induce detracking of the left and right support wheels 114', 115' from the endless track 90'.

As described hereinabove, the present technology aids the track system 50 to better conform to uneven surfaces, which allows for better load distribution across the endless track 90, reduces wear on the lugs 94 and reduces chances of detracking.

Second Embodiment

Referring now to FIGS. 9 to 15, a second embodiment of the support structure 100, support structure 205, will be described with reference to a track system 51. The track system 51 is a rear left track system, and is adapted to be operatively connected to the rear left corner of the vehicle 40. Features of the track system 51 and the support structure 205 that are similar to those of the track system 50 and the support structure 105 described above have been labelled with the same reference numerals, and will not be described again in detail unless a significant difference is noted. In the present embodiment, there are four support structures 205 connected to the track system 51. As the four support structures 205 are similar, only one support structure 205 will be described in detail herein.

Figure 10:
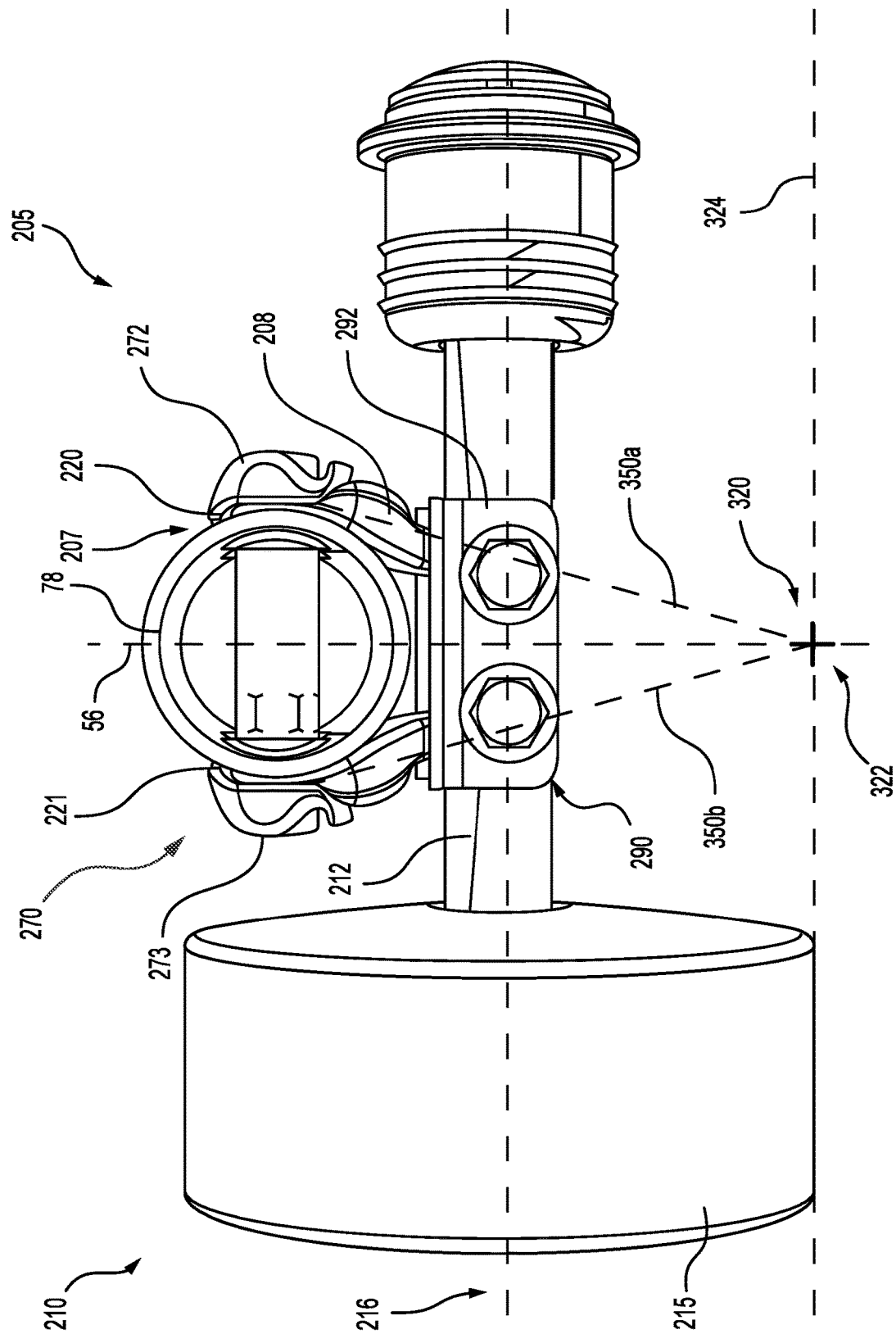
FIG. 10 is a front elevation view of one of the support structures of the track system of FIG. 9 connected to a portion of a frame member, and parts of a support wheel assembly connected to the support structure.
Figure 11:
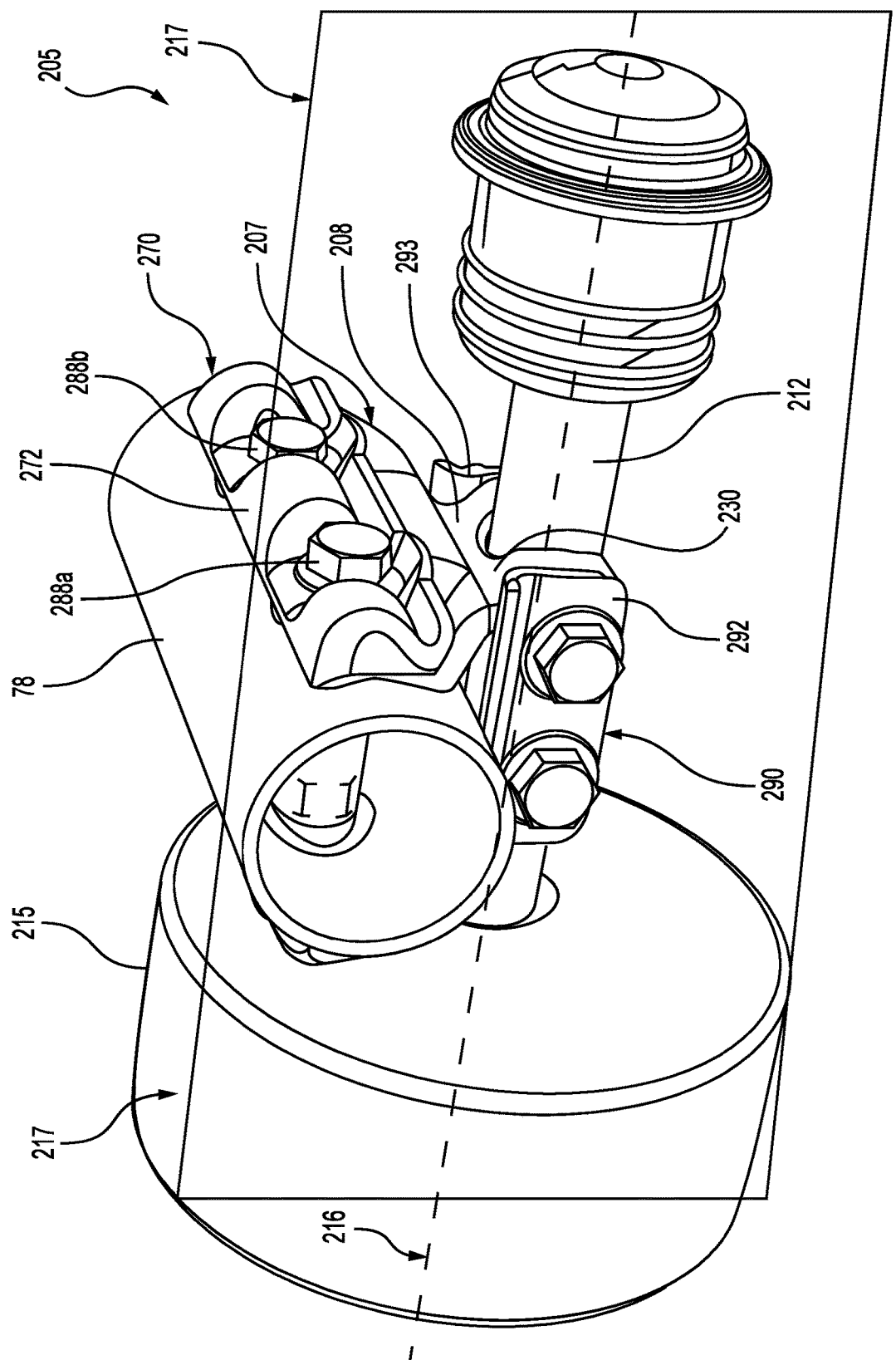
FIG. 11 is a perspective view taken from a top, front, left side of the support structure of FIG. 10.
Figure 13:
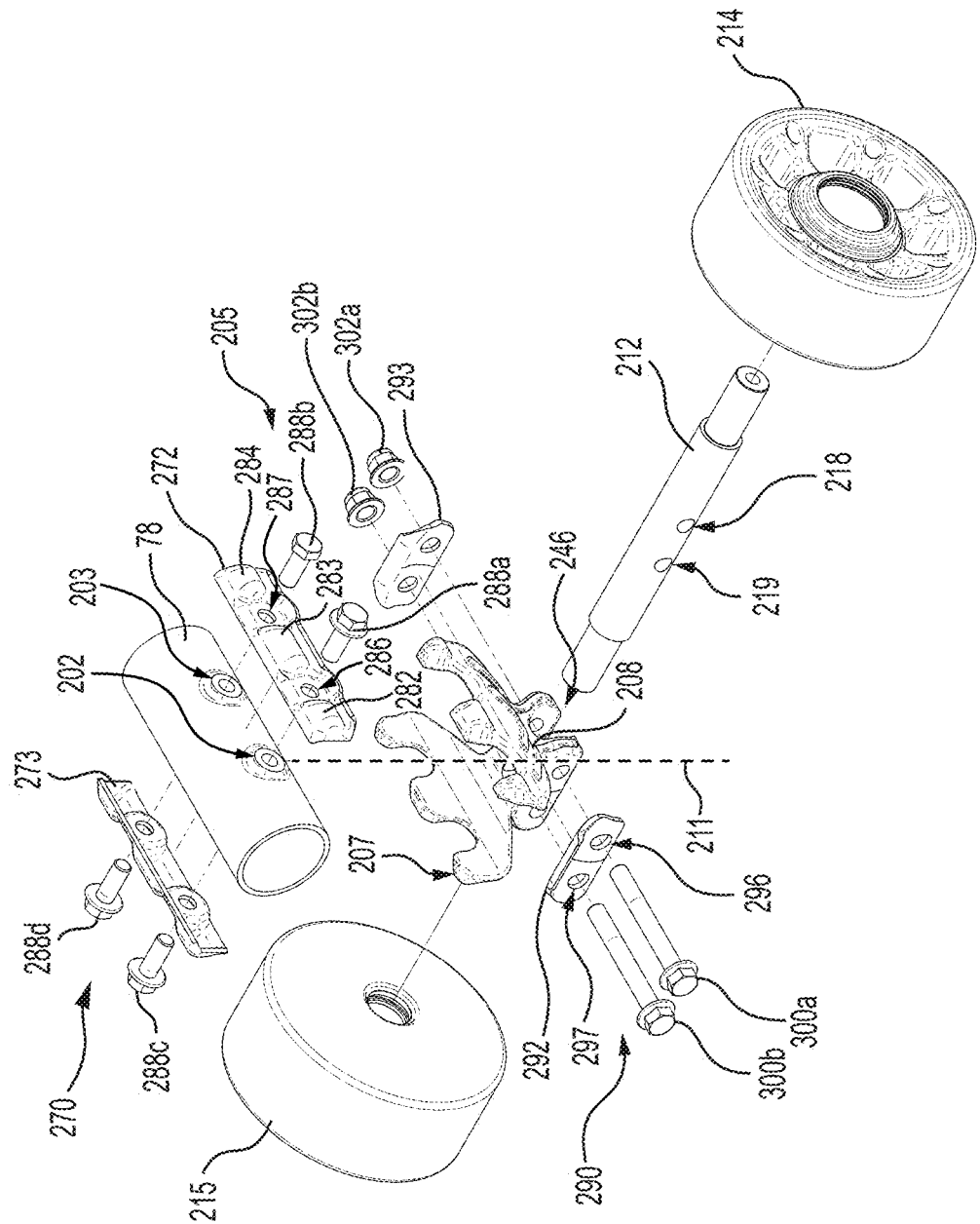
FIG. 13 is a partially exploded perspective view taken from a top, front, left side of the support structure of FIG. 10.

Referring to FIGS. 10, 11 and 13, in the present embodiment, the frame member 78 of the track system 51 has a tubular shape, and extends along the longitudinal center plane 56 of the track system 51. It is contemplated that in other embodiments, the frame member 78 could have a prismatic shape or another shape. The frame member 78 defines eight apertures along its length, but referring to the section of the frame member 78 connected to the support structure 205 currently being described, the frame member 78 defines a leading aperture 202, and a trailing aperture 203 (FIG. 13). The leading and trailing apertures 202, 203 extend throughout the entirety of the frame member 78, from the left side to the right side.

The support structure 205 includes an axle 212, a resilient assembly 207 including a resilient body 208, a frame clamping assembly 270, and an axle clamping assembly 290, all of which are described in greater detail below.

Referring to FIGS. 10 and 11, the support structure 205 has the axle 212 that is adapted to support a support wheel assembly 210. The axle 212 is positioned below the frame member 78 such that the axle 212 is vertically spaced from the frame member 78. The axle 212 has an axle axis 216 that extends generally transversally to the longitudinal center plane 56. Thus, the axle 212 also extends generally transversally to the longitudinal center plane 56. The axle 212 also has an axle plane 217. The axle plane 217 extends vertically, and contains the axle axis 216. The axle plane 217, which passes through the middle of the axle 212, defines a forward side and a rearward side of the axle 212. Given the resilient nature of the resilient assembly 207, it is contemplated that some range of motion in yaw (i.e. motion of the axle 212 about a vertically extending axis 211 shown in FIG. 13) could be allowed such that it is possible that the axle 212, the axle axis 216 and the axle plane 217 could be skewed from the longitudinal center plane 56. In the present embodiment, the axle 212 defines a left aperture 218, and a right aperture 219. The left and right apertures 218, 219 extend throughout the axle 212, from the forward side to the rearward side.

The support wheel assembly 210 includes a left support wheel 214 and a right support wheel 215, that are rotatably connected to the axle 212. In the present embodiment, the left and right support wheels 214, 215 each have a diameter of 144 millimetres (5.67 in). It is contemplated that in other embodiments, the left and right support wheels 214, 215 could be sized differently. For instance, the diameters could range from 129 millimetres (5.08 in) to 159 millimetres (6.26 in). It is contemplated that in some embodiments, there could be a support wheel bogie and a tandem support wheel assembly connected to the axle 212. It is contemplated that in such embodiments, the support wheel bogie and the tandem support wheel assembly could have two or more wheels connected thereto. It is also contemplated that in some embodiments, the support wheel bogie and the tandem support wheel assembly could be rotatable about the axle 212.

Referring to FIGS. 12 and 13, the support structure 205 also has the resilient assembly 207 that includes the resilient body 208. The resilient body 208 is connectable to the axle 212 and connectable to the frame member 78. In the present embodiment, the resilient body 208 has a left frame connecting portion 220, a right frame connecting portion 221, an intermediate portion 230, a leading axle connecting portion 240 and a trailing axle connecting portion 241. In the present embodiment, the left and right frame connecting portions 220, 221, the intermediate portion 230, the leading and trailing axle connecting portions 240, 241 are one integral body. It is contemplated that in some embodiments, the left frame connecting portion 220 and the axle connecting portion 240 could be integral and/or the right frame connecting portion 221 and the axle connecting portion 241 could be integral. It is also contemplated that in some embodiments, the left and right frame connecting portions 220, 221, the intermediate portion 230, the leading and trailing axle connecting portions 240, 241 could be distinct parts connected together. As will be described in greater detail below, the resilient body 208 is substantially rigid, such that the resilient body 208 is capable of withstanding compressive forces. The resilient body 208 is also flexible such that the resilient body 208 can resiliently deform. However, the resilient body 208 does not significantly extend when in tension. In the present embodiment, the resilient body 208 is made from a polymeric material. It is contemplated that the resilient body 208 could be made from another suitable resilient material. It is also contemplated that in some embodiments, the resilient body 208 could include reinforcing members such as steel cords, fabrics, fibers, various layers, etc. incorporated thereto to modify the mechanical properties of the resilient body 208.

Figure 12A:
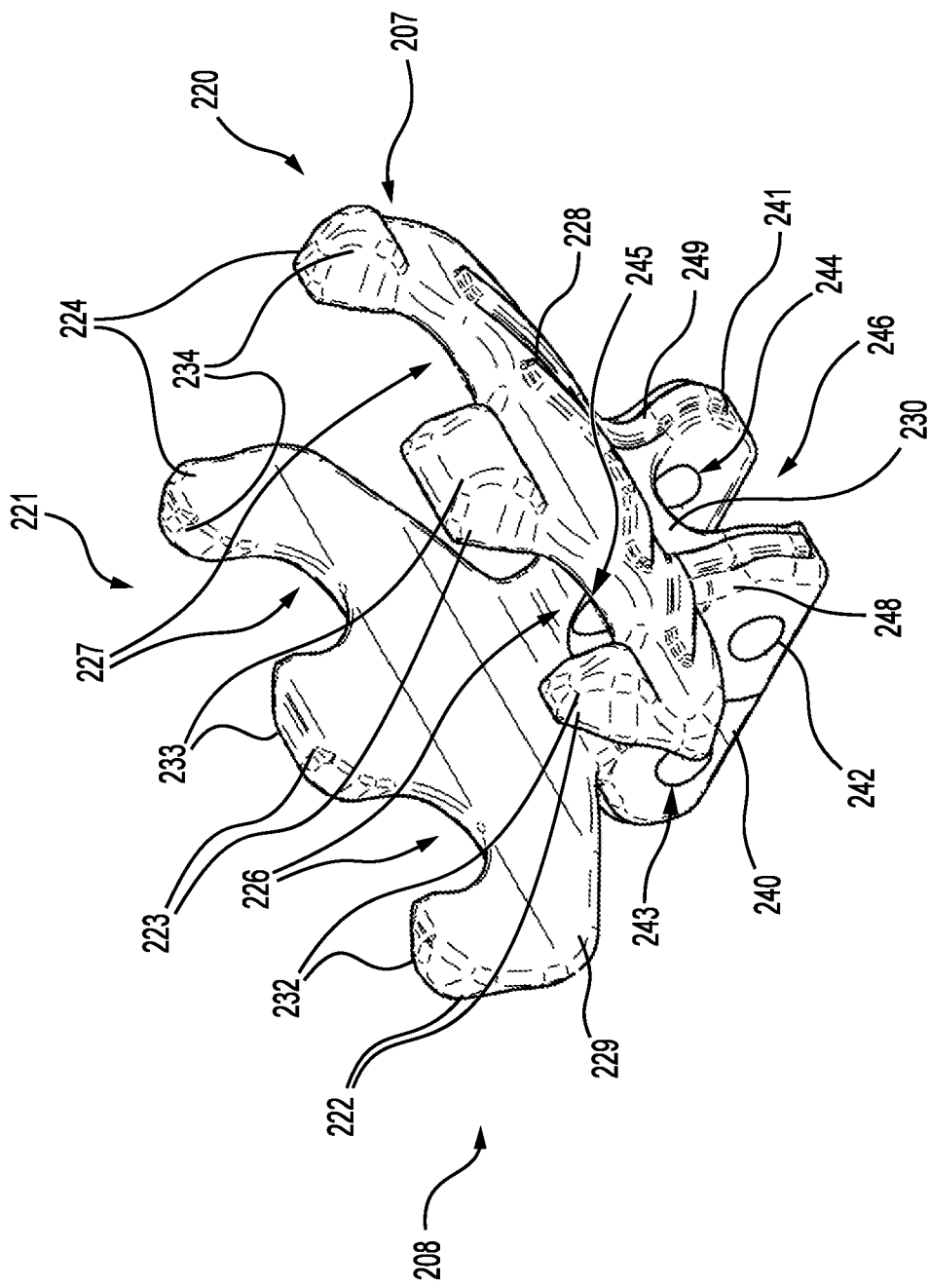
FIG. 12a is a perspective view taken from a top, front, left side of a resilient body of the support structure of FIG. 10.

Referring to FIG. 12a, the left and right frame connecting portions 220, 221, which are connectable to the frame member 78, will now be described in greater detail. The left frame connecting portion 220 extends between the frame member 78 and the axle 212, and is disposed on the left side of the frame member 78. The right frame connecting portion 221 extends between the frame member 78 and the axle 212, and is disposed on the right side of the frame member 78. It is contemplated that in some embodiments, the left and right frame connecting portions 220, 221 could surround the frame member 78, such that there could be a single frame connecting portion. In the present embodiment, each one of the left and right frame connecting portions 220, 221 has a leading member 222, an intermediate member 223 and a trailing member 224. Each of the leading members 222 has a protuberance 232, each of the intermediate members 223 has a protuberance 233 and each of the trailing members 224 has a protuberance 234. As will be described in greater detail below, the protuberances 232, 233, 234 are adapted for engaging with the frame clamping assembly 270. In the present embodiment, the left and right frame connecting portions 220, 221 each define a recess 226 between the leading and intermediate members 222, 223, and a recess 227 between the intermediate and trailing members 223, 224. It is contemplated that in some embodiments, the recesses 226, 227 could be omitted, such that the leading, intermediate and trailing members 222, 223, 224 could be one member. It is also contemplated that there could be more or less than two recesses 226, 227. In the present embodiment, as best seen in FIG. 12b, the left and right frame connecting portions 220, 221 are formed from a resilient material. The left frame connecting portion 220 has a left connecting portion 228 extending from the left frame connecting portion 220 toward the intermediate portion 230, and the right frame connecting portion 221 has a right connecting portion 229 extending from the right frame connecting portion 221 toward the intermediate portion 230. In the present embodiment, the left and right connecting portions 228, 229 are more flexible than the rest of the left and right frame connecting portions 220, 221.

The resilient body 208 also has the intermediate portion 230. In the present embodiment, there is one intermediate portion 230. It is contemplated that there could be more than one intermediate portion 230. For instance, in embodiments with more than one resilient body 208, there could be more than one intermediate portion 230. The intermediate portion 230 extends between the left and right frame connecting portions 220, 221 and the leading and trailing axle connecting portions 240, 241. The intermediate portion 230 connects the left and right frame connecting portions 220, 221 to the axle connecting portions 240, 241. In the present embodiment, the intermediate portion 230 is more rigid than the left and right frame connecting portions 220, 221 and than the leading and trailing axle connecting portions 240, 241. The rigidity of the intermediate portion 230 can be selected depending on the requirements and objectives set by the designer of the support structure 205, and can be selected for example by changing the cross-sectional area between the frame and axle connecting portions 220, 221, 240, 241 and the intermediate portion 230.

The leading and trailing axle connecting portions 240, 241, which are connectable to the axle 212, will now be described in greater detail. The leading and trailing axle connecting portions 240, 241 are spaced from the left and right frame connecting portions 220, 221. The leading axle connecting portion 240 extends parallel to the axle axis 216, along the leading side of the axle 212. The trailing axle connecting portion 241 extends parallel to the axle axis 216, along the trailing side of the axle 212. It is contemplated that in some embodiments, the leading and trailing axle connecting portions 240, 241 could cover the axle 212, such that there could be only one axle connecting portion. The leading and trailing connecting portions 240, 241 define a recess 246 therebetween. As will be described in greater detail below, the recess 246 is adapted to receive the axle 212 therein. The leading axle connecting portion 240 defines a left aperture 242 and right aperture 243, and the trailing axle connecting portion 241 defines a left aperture 244 and a right aperture 245. The left and right apertures 242, 243 are, respectively, coaxial to the left and right apertures 244, 245. As will be described below, the left apertures 242, 244 are coaxial to the left aperture 218 of the axle 212, and the right apertures 243, 245 are coaxial to the right aperture 219 of the axle 212. In the present embodiment, as best seen in FIG. 12b, the leading and trailing axle connecting portions 240, 241 are formed from a resilient material. The leading axle connecting portion 240 has a leading connecting portion 248 extending from the leading axle connecting portion 240 toward the intermediate portion 230, and the trailing axle connecting portion 241 has a trailing connecting portion 249 extending from the trailing axle connecting portion 241 toward the intermediate portion 230. In the present embodiment, the leading and trailing connecting portions 248, 249 are more flexible than the rest of the leading and trailing axle connecting portions 240, 241.

Referring to FIG. 12b, as will be described in greater detail below, when the resilient assembly 207, and thus when the resilient body 208 deforms, it is primarily the left and right connecting portions 228, 229 and the leading and trailing connecting portions 248, 249, which as mentioned above are more flexible than the rest of the resilient body 208, that deform.

Referring to FIGS. 11 and 13, the frame clamping assembly 270, which is adapted for clamping the left and right frame connecting portions 220, 221 to the frame member 78 will now be described. In the present embodiment, the frame clamping assembly 270 includes a left clamping member 272 and a right clamping member 273. It is contemplated that in some embodiments, there could be more or less than two clamping members 272, 273. As the left and right frame clamping members 272, 273 are similar, only the left frame clamping member 272 will be described in detail.

The left frame clamping member 272 extends longitudinally along the left side of the frame member 78, and in the present embodiment, generally has the same longitudinal length as the left frame connecting portion 220. The frame clamping member 272 has a leading receiving portion 282, an intermediate receiving portion 283 and a trailing receiving portion 284. The leading, intermediate and trailing receiving portions 282, 283, 284 are adapted to receive the leading, intermediate and trailing members 222, 223, 224. The frame clamping member 272 also defines an aperture 286 between the leading and intermediate receiving portions 282, 283, and an aperture 287 between the intermediate and trailing portions 283, 284.

The frame clamping assembly 270 further includes four bolts 288a, 288b, 288c, 288d. It is contemplated that in some embodiments, there could be more or less than four bolts 288a, 288b, 288c, 288d. The bolts 288a, 288b, 288c, 288d connect the left and right frame clamping members 272, 273 and the left and right frame connecting portions 220, 221 to the frame member 78. It is contemplated that in some embodiments, the left and right frame clamping members 272, 273 could be omitted such that the bolts 288a, 288b, 288c, 288d could directly clamp the left and right frame connecting portions 220, 221 to the frame member 78. It is also contemplated that in some embodiments, the left and right frame clamping members 272, 273 could clamp the left and right frame connecting portions 220, 221 to the frame member 78 without the bolts 288a, 288b, 288c, 288d. It is contemplated that in some embodiments, the frame clamping assembly 270 could connect the left and right frame connecting portions 220, 221 to the frame member 78 differently, such as by using an adhesive, bonding or snapping.

Still referring to FIGS. 11 and 13, the axle clamping assembly 290, which is adapted for clamping the leading and trailing axle connecting portions 240, 241 to the axle 212 will now be described. In the present embodiment, the axle clamping assembly 290 includes a leading clamping member 292 and a trailing clamping member 293. It is contemplated that in some embodiments, there could be more or less than two clamping members 292, 293. As the leading and trailing axle clamping members 292, 293 are similar, only the leading axle clamping member 292 will be described in detail.

The axle clamping member 292 extends along the length of the axle 112 and in the present embodiment, generally has the same lateral length as the leading axle connecting portion 240. The leading axle clamping member 292 defines a left aperture 296 and a right aperture 297. As will be described in greater detail below, the leading axle clamping member 292 is adapted to be connected to the axle connecting portion 240.

The axle clamping assembly 290 also includes two bolts 300a, 300b and two nuts 302a, 302b. As will be described in greater detail below, in the present embodiment, the bolts 300a, 300b and the nuts 302a, 302b clamp the leading and trailing axle clamping members 292, 293 and the leading and trailing axle connecting portions 240, 241 to the axle 212. It is contemplated that in some embodiments, the leading and trailing axle clamping members 292, 293 could be omitted such that the bolts 300a, 300b could directly clamp the leading and trailing axle connecting portions 240, 241 to the axle 212. It is also contemplated that in some embodiments, the leading and trailing axle clamping members 292, 293 could clamp the left and right axle connecting portions 240, 241 to the axle 212 without the bolts 300a, 300b. It is contemplated that in some embodiments, the axle clamping assembly 290 could connect the leading and trailing axle connecting portions 240, 241 to the axle 212 differently, such as by using an adhesive, bonding or snapping.

Referring to FIGS. 10 to 13, the support structure 205, as assembled, will now be described.

The resilient body 208 is connected to the frame member 78 by the frame clamping assembly 270. More precisely, the left frame connecting portion 220 engages the left frame clamping member 272, such that the protuberance 232 of the leading member 222 is received in the leading receiving portion 282, the protuberance 233 of the intermediate member 223 is received in the intermediate receiving portion 283, and the protuberance 234 of the trailing member 224 is received in the trailing receiving portion 284. The bolt 288a is received in the leading aperture 286 of the left frame clamping member 272 and the leading aperture 202 of the frame member 78. A nut (not seen) is fastened to a portion of the bolt 288a extending through the leading apertures 202, 286, inside the frame member 78. The bolt 288b is received in the trailing aperture 287 of the left frame clamping member 272 and the trailing aperture 203 of the frame member 78. A nut (not seen) is fastened to a portion of the bolt 288b extending through the trailing apertures 203, 287, inside the frame member 78.

Likewise, the right frame connecting portion 221 engages the right frame clamping member 273, such that the protuberance 232 of the leading member 222 is received in the leading receiving portion 282, the protuberance 233 of the intermediate member 223 is received in the intermediate receiving portion 283, and the protuberance 234 of the trailing member 224 is received in the trailing receiving portion 284. The bolt 288c is received in the leading aperture 286 of the right frame clamping member 273 and the leading aperture 202 of the frame member 78. A nut (not seen) is fastened to a portion of the bolt 288*c* extending through the leading apertures 202, 286, inside the frame member 78. The bolt 288*d* is received in the trailing aperture 287 of the right frame clamping member 273 and the trailing aperture 203 of the frame member 78. A nut (not seen) is fastened to a portion of the bolt 288*d* extending through the trailing apertures 203, 287, inside the frame member 78.

In the present embodiment, the left and right frame clamping members 272, 273 fully cover the area of, respectively, the left and right frame connecting portions 220, 221. It is contemplated that in some embodiments, the left and right frame clamping members 272, 273 could cover only partially the left and right frame connecting portions 220, 221. As will be described in more detail below, when the left and right frame connecting portions 220, 221 undergo stress, the left and right frame clamping members 272, 273 could help spread stress throughout the left and right frame connecting portions 220, 221. When the nuts are tightened, the resilient body 208 is connected to the frame member 78.

The resilient body 208 is connected to the axle 212 by the axle clamping assembly 290. The axle 212 is received in the recess 246. It is to be appreciated that the axle 212 can be received in the recess 246 from below, which can facilitate the servicing of the track system 51 when needed. More precisely, the bolt 300*a* is received in the left aperture 296 of the leading axle clamping member 292, in the left aperture 242 of the leading axle connecting portion 240, in the left aperture 218 of the axle 212, in the left aperture 244 of the trailing axle connecting portion 241 and the left aperture 296 of the trailing axle clamping member 293. The nut 302*a* is fastened to a portion of the bolt 300*a* extending through the left apertures 218, 244, 296. The right side of the axle connecting portions 240, 241 is connected likewise.

In the present embodiment, the leading and trailing axle clamping members 292, 293 fully cover the area of, respectively, the leading and trailing axle connecting portions 240, 241. It is contemplated that in some embodiments, the leading and trailing axle clamping members 292, 293 could only partially cover the leading and trailing axle connecting portions 240, 241. As will be described in more detail below, when the leading and trailing axle connecting portions 240, 241 undergo stress, the leading and trailing axle clamping members 292, 293 could help spread stress throughout the leading and trailing axle connecting portions 240, 241. When the nuts 302 are tightened, the resilient body 208 is connected to the axle 212.

In the present embodiment, the left and right frame connecting portions 220, 221 are laterally further from the longitudinal center plane 56 than the leading and trailing axle connecting portions 240, 241.

Referring to FIG. 10, the resilient assembly 207 defines an imaginary pivot 320. More precisely, as the left and right frame connecting portions 220, 221 are laterally further from the longitudinal center plane 56 than the leading and trailing axle connecting portions 240, 241, left and right projections 350*a*, 350*b*, that, respectively, pass through the left and right sides of the resilient body 208, intersect. The point of intersection between the left and right projections 350*a*, 350*b* is the imaginary pivot 320.

As shown in FIG. 10, when the support structure 205 is in an initial position, the imaginary pivot 320 defines a pivot axis 322 that is laterally aligned with the longitudinal center plane 56. The pivot axis 322 is positioned below the axle axis 216, and extends generally parallel to the longitudinal center plane 56. Given the resilient nature of the resilient body 208, it is contemplated that the pivot axis 322 could be laterally offset from the longitudinal center plane 56. As briefly described above, and described in more detail below, maintaining the imaginary pivot 320 and the pivot axis 322 within the disclosed vertical range could help reduce wear of the endless track 90. Maintaining the imaginary pivot 320 and the pivot axis 322 within a certain lateral range, as described below, could also help reduce wear of the endless track 90.

As will be described below, the resilient body 208 is configured such that the imaginary pivot 320, and thus the pivot axis 322, is relatively stationary relative to the longitudinal center plane 56. However, it is contemplated that in some embodiments, the imaginary pivot 320, and thus the pivot axis 322, could move laterally.

Referring to FIG. 10, in the present embodiment, the imaginary pivot 320 and the pivot axis 322 are vertically aligned with the bottommost portion of the left and right support wheels 214, 215, which engage the inner surface 92 of the endless track 90. In other words, the pivot axis 322 is contained in a plane 324 defined by the bottommost portion of the left and right support wheels 214, 215. It is contemplated that in some embodiments, the imaginary pivot 320 and the pivot axis 322 could be vertically spaced upwardly from the plane 324 within about 25% of a distance between the axle axis 216 and the plane 324. As the vertical position of the imaginary pivot 320 increases, the support structure 205 becomes more unstable. In yet other embodiments, the imaginary pivot 320 and the pivot axis 322 could be vertically spaced downwardly from the plane 324 within about 25% of the distance between the axle axis 216 and the plane 324. As the vertical position of the imaginary pivot 320 decreases, the imaginary pivot 320 is more likely to move laterally.

As will be elaborated below, the resilient body 208 is deformable such that the axle 212 is pivotable about the pivot axis 322 within a range of motion of fifteen degrees in the clockwise or counter-clockwise directions. It is contemplated that in some embodiments, the range of motion could be less than fifteen degrees.

Though the resilient body 208 is flexible, the resilient body 208 is also sufficiently rigid such that the resilient body 208 can withstand some of the weight of the track system 51 and the vehicle 40. In the present embodiment, the left and right connecting portions 228, 229 and the leading and trailing connecting portion 248, 249 are more flexible than the intermediate portion 230. It is contemplated that in some embodiments, the left and right connecting portions 228, 229 could be more or less flexible than the leading and trailing connecting portions 248, 249. In the present embodiment, the left and right frame connecting portions 220, 221 and the leading and trailing axle connecting portions 240, 241 are equally flexible. It is contemplated that in some embodiments, the left and right frame connecting portions 220, 221 and the leading and trailing axle connecting portions 240, 241 could be more or less flexible than one another. In the present embodiment, when the resilient assembly 207, and thus the resilient body 208 deforms, it is primarily the left and right connecting portions 228, 229 and the leading and trailing connecting portions 248, 249 that deform.

In the present embodiment, when the resilient body 208 deforms so that the axle 212 can pivot about the pivot axis 322, the pivot axis 322 remains stationary relative to the longitudinal center plane 56 of the track system 51. In some embodiments, however, given that the imaginary pivot 320 is defined by the resilient body 208, the imaginary pivot 320 and the pivot axis 322 could move laterally relative to the longitudinal center plane 56, as the resilient body 208 deforms. In such embodiments, it is contemplated that the imaginary pivot 320 and the pivot axis 322 could move laterally by up to about three millimetres (0.12 in), when the axle 212 pivots about fifteen degrees about the pivot axis 322. In some track systems known in the prior art, the lateral displacement of a support structure that pivots fifteen degrees could reach about twelve millimetres (0.47 in). The larger the lateral displacement is, the more likely it is that the support wheels 214, 215 could come into contact with the lugs 94, thereby increasing wear.

Therefore, when the track system 51 encounters an obstacle, or uneven terrain on either of its left and right sides, the support structure 205 is adapted to allow the support wheels 214, 215 and the endless track 90 to better conform to the obstacle or the uneven terrain. More precisely, the resilient body 208 deforms such that the axle 212 can pivot about the pivot axis 322, allowing the left and right support wheels 214, 215 to pivot, while reducing the interference of the left and right support wheels 214, 215 with the lugs 94 and thus reducing wear of the endless track 90.

Description of the Pivoting Mechanism

Referring now to FIGS. 14a to 15c, the track system 51 and the support structure 205 will be described, as the track system 51 and the support structure 205 overcome obstacles of varying sizes.

Figure 14A:
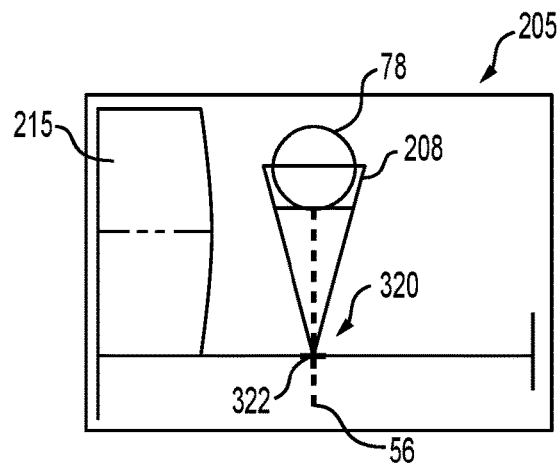
FIG. 14a is a schematic illustration of the support structure of FIG. 10 being at an initial position.

Referring to FIG. 14a, the support structure 205 is shown on a flat, level surface. The support structure 205 is in the initial position. As mentioned above, when the support structure 205 are positioned on a flat, level surface, the pivot axis 322 is vertically aligned with the inner surface 92 of the endless track 90, and laterally aligned with the longitudinal center plane 56. When the support structure 205 is in the initial position, the axle 212 is not pivoted about the pivot axis 322.

Figure 15A:
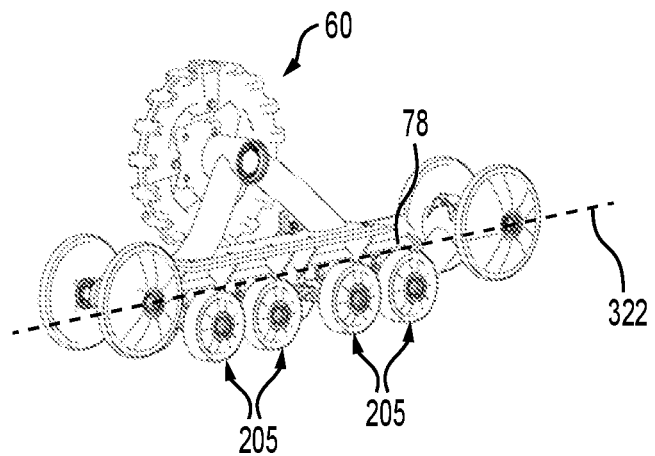
FIG. 15a is a perspective view taken from a top, front, left side of the track system of FIG. 9, with an endless track being omitted and the support structures being at an initial position.

Referring to FIG. 15a, the support structures 205 are shown positioned on a flat, level surface.

Figure 14B:
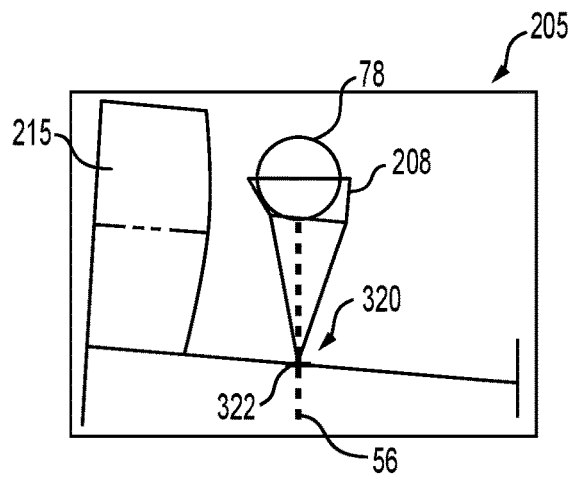
FIG. 14b is a schematic illustration of the support structure of FIG. 10 being pivoted at five degrees in a clockwise direction.

Referring to FIG. 14b, the support structure 205 has encountered an obstacle such that the right support wheel 215 is elevated with respect to the left support wheel 214. The resilient body 208 has deformed such that the axle 212 has pivoted about the pivot axis 322 by five degrees (in the clockwise direction in FIG. 14b), thereby allowing the right support wheel 215 and the corresponding portion of the endless track 90 to better conform to the obstacle. The resilient body 208 deforming induces stress therein. The frame and axle clamping members 272, 273, 292, 293 aid in distributing stress throughout the frame and axle connecting portions 220, 221, 240, 241. The imaginary pivot 320, and thus the pivot axis 322, is still laterally aligned with the longitudinal center plane 56. In other words, the pivot axis 322 is still contained in the longitudinal center plane 56.

Figure 14C:
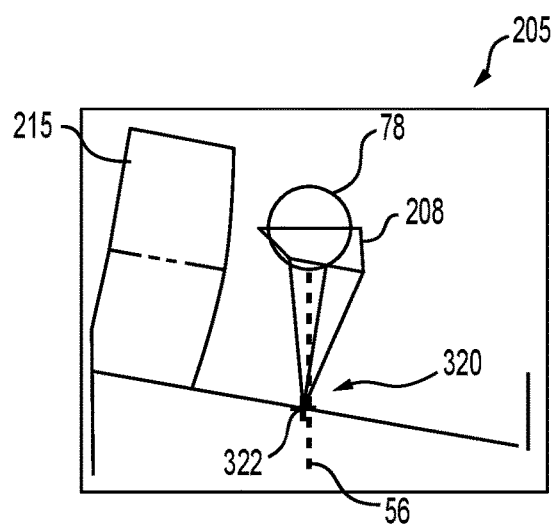
FIG. 14c is a schematic illustration of the support structure of FIG. 10 being pivoted at ten degrees in the clockwise direction.

Referring to FIG. 14c, the support structure 205 has encountered an obstacle such that the right support wheel 215 is elevated with respect to the left support wheel 214. The resilient body 208 has deformed such that the axle 212 has pivoted about the pivot axis 322 by ten degrees (in the clockwise direction in FIG. 14c), thereby allowing the right support wheel 215 and the corresponding portion of the endless track 90 to better conform to the obstacle. The resilient body 208 deforming induces stress therein. The frame and axle clamping members 272, 273, 292, 293 aid in distributing stress throughout the frame and axle connecting portions 220, 221, 240, 241. The imaginary pivot 320, and thus the pivot axis 322, has moved laterally to the right by one millimetre (0.039 in), such that the imaginary pivot 320 is no longer laterally aligned with the longitudinal center plane 56. It is contemplated that in some embodiments, the imaginary pivot 320, and thus the pivot axis 322, could move less than one millimetre (0.039 in). It is also contemplated that in some embodiments, the imaginary pivot 320, and thus the pivot axis 322, could still be aligned with the longitudinal center plane 56. In the present embodiment, the lateral movement does not cause the left and/or right support wheels 214, 215 to interfere with the lugs 94.

Figure 15B:
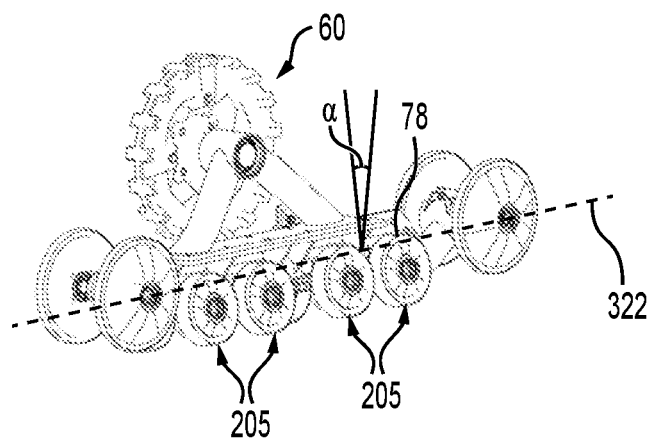
FIG. 15b is a perspective view taken from a top, front, left side of the track system of FIG. 9, with the endless track being omitted and the support structures being pivoted at ten degrees.

Referring to FIG. 15b, the support structures 205 have pivoted about the pivot axis 322 by ten degrees, in the counter-clockwise direction, shown by angle α.

Figure 14D:
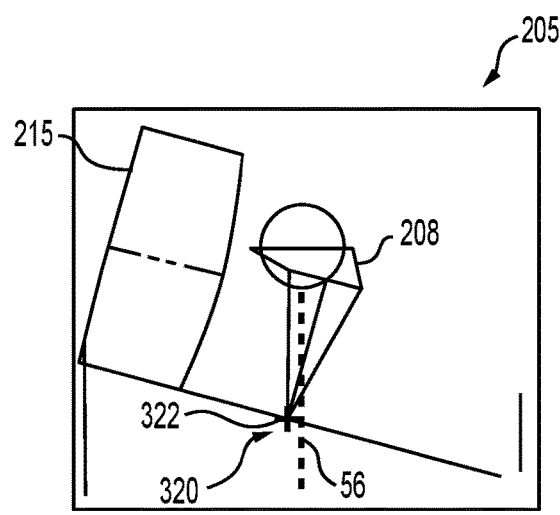
FIG. 14d is a schematic illustration of the support structure of FIG. 10 being pivoted at fifteen degrees in the clockwise direction.

Referring to FIG. 14d, the support structure 205 has encountered an obstacle such that the right support wheel 215 is elevated with respect to the left support wheel 214. The resilient body 208 has deformed such that the axle 212 has pivoted about the pivot axis 322 by fifteen degrees (in the clockwise direction in FIG. 14d), thereby allowing the right support wheel 215 and the corresponding portion of the endless track 90 to better conform to the obstacle. The resilient body 208 deforming induces stress therein. The frame and axle clamping members 272, 273, 292, 293 aid in distributing stress throughout the frame and axle connecting portions 220, 221, 240, 241. The imaginary pivot 320, and thus the pivot axis 322, has moved laterally to the right by three millimetres (0.12 in), such that the imaginary pivot 320 is no longer aligned with the longitudinal center plane 56. It is contemplated that in some embodiments, the imaginary pivot 320, and thus the pivot axis 322, could also move less than three millimetres (0.12 in). It is also contemplated that in some embodiments, the imaginary pivot 320, and thus the pivot axis 322, could still be laterally aligned with the longitudinal center plane 56. In the present embodiment, the lateral movement still does not cause the left and/or right support wheels 214, 215 to interfere with the lugs 94.

Figure 15C:
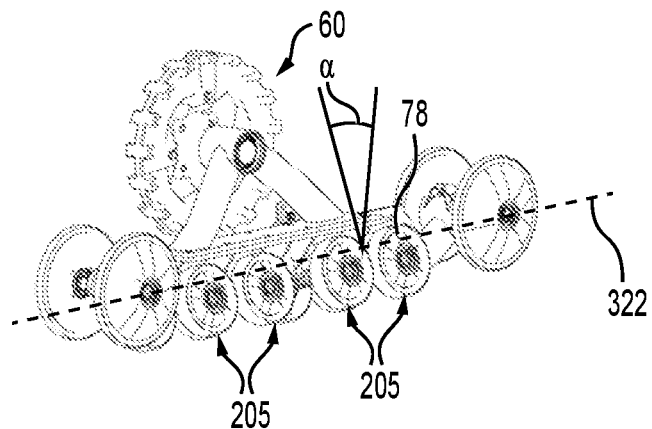
FIG. 15c is a perspective view taken from a top, front, left side of the track system of FIG. 9, with the endless track being omitted and the support structures being pivoted at fifteen degrees.
Figure 16:
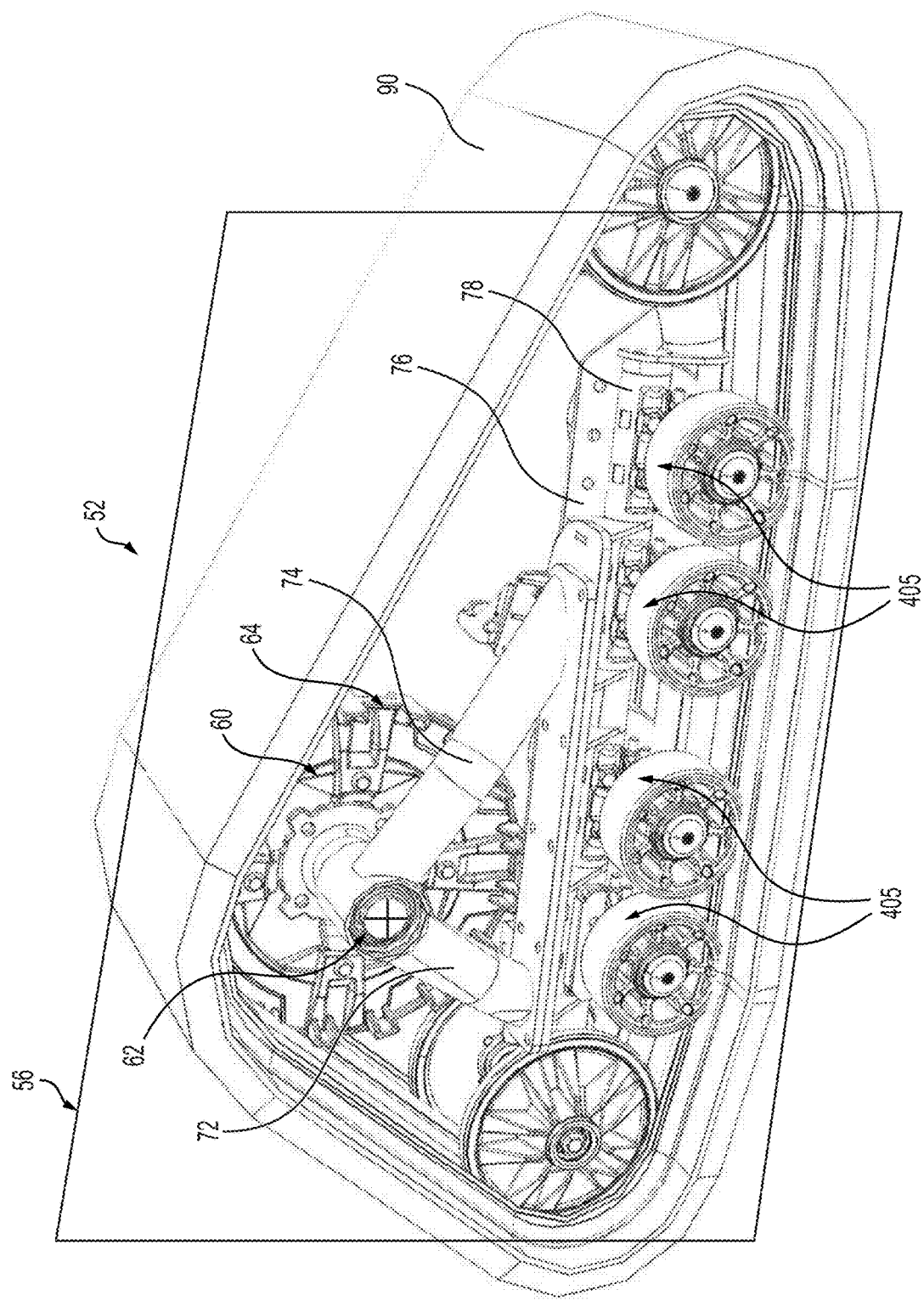
FIG. 16 is a perspective view taken from a top, rear, left side of a rear left track system having support structures in accordance with a third embodiment of the present technology.

Referring to FIG. 15c, the support structures 205 have pivoted about the pivot axis 322 by fifteen degrees, in the counter-clockwise direction, shown by angle α.

As indicated above, reducing the lateral movement of the pivot axis 322 with respect to the longitudinal center plane 56 may assist in reducing wear of the lugs 94 in some conditions.

As described hereinabove, the present technology aids the track system 51 to better conform to uneven surfaces, which allows for better load distribution across the endless track 90, reduces wear on the lugs 94 and reduces chances of detracking.

In addition, when travelling over uneven terrain, the track system 51 is subject to vibrations and shocks. Due to the resilient nature of the resilient body 208, the support structure 205 acts as a damper. The support structure 205 can thus further improve the overall durability of the track system 51 by absorbing some vibrations.

Third Embodiment

Referring now to FIGS. 16 to 24, a third embodiment of the support structure 100, support structure 405, will be described with reference to a track system 52. The track system 52 is a rear left track system, and is adapted to be operatively connected to the rear left corner of the vehicle 40. Features of the track system 52 and the support structure 405 that are similar to those of the support structure 105, the support structure 205, the track systems 50 and the track system 51 described above have been labelled with the same reference numerals, and will not be described again in detail, unless a significant difference is noted. In the present embodiment, there are four support structures 405 connected to the track system 52. As the four support structures 405 are similar, only one support structure 405 will be described in detail herein.

Figure 17:
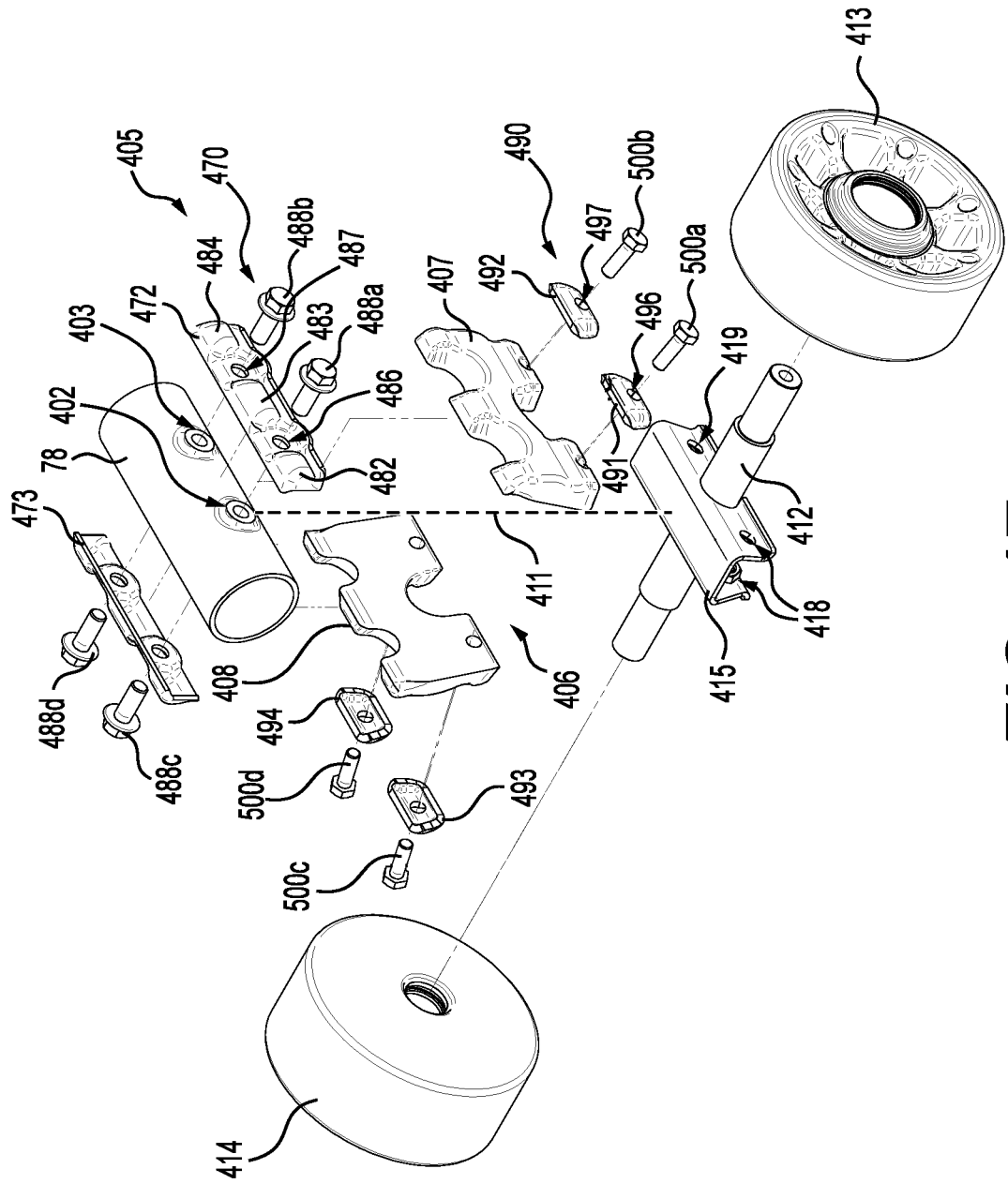
FIG. 17 is a partially exploded perspective view taken from a top, front, left side of one of the support structures of the track system of FIG. 16 connected to a portion of a frame member, and a support wheel assembly connected to the support structure.

Referring to FIG. 17, in the present embodiment, the frame member 78 of the track system 52 has a tubular shape, and extends along the longitudinal center plane 56 of the track system 52. It is contemplated that in other embodiments, the frame member 78 could have a prismatic shape or another shape. The frame member 78 defines eight apertures along its length, but referring to the section of the frame member 78 connected to the support structure 405 currently being described, the frame member 78 defines a leading aperture 402, and a trailing aperture 403. The leading and trailing apertures 402, 403 extend throughout the frame member 78, from the left side to the right side.

The support structure 405 includes an axle 412, a resilient assembly 406 including a left resilient body 407 and a right resilient body 408, a frame clamping assembly 470 and an axle clamping assembly 490.

Figure 18:
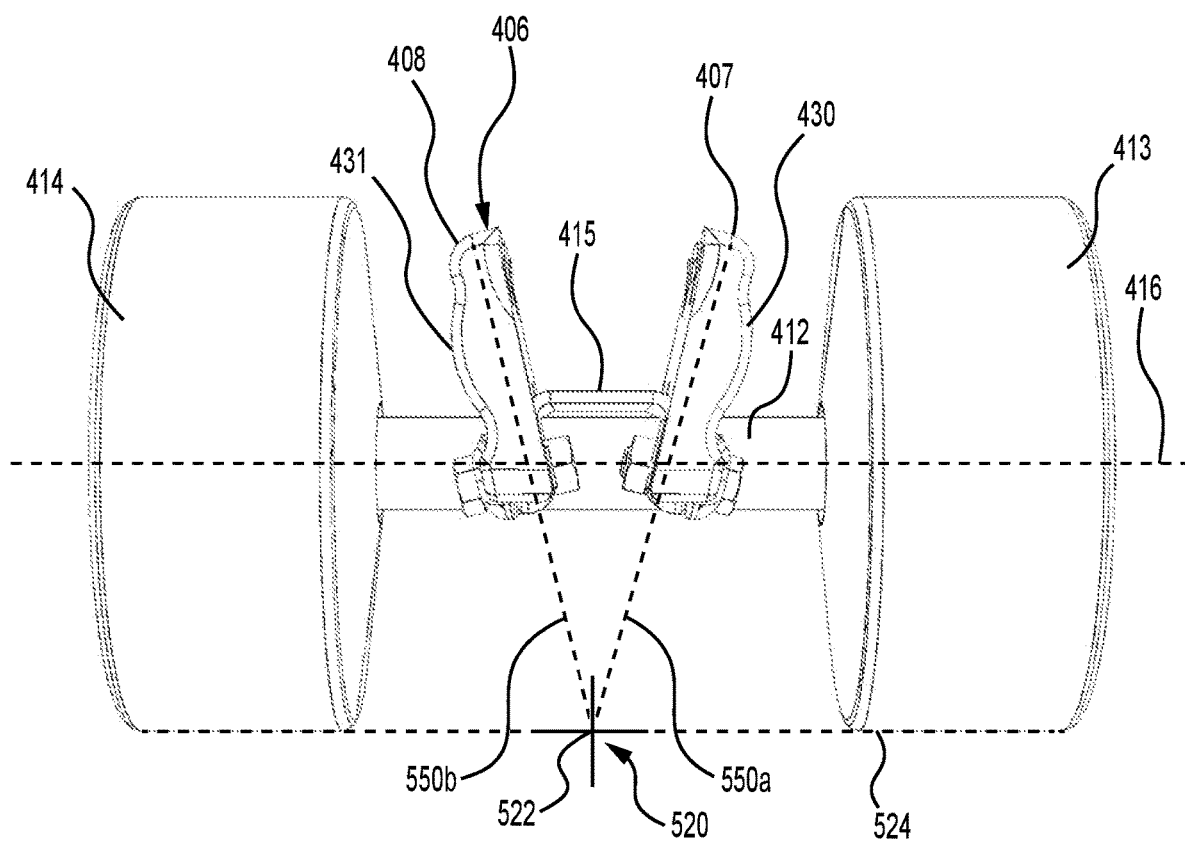
FIG. 18 is a front elevation view of left and right resilient bodies, an axle linkage, an axle and an axle clamping assembly of the support structure of FIG. 17, with the support wheel assembly being connected to the axle.
Figure 19:
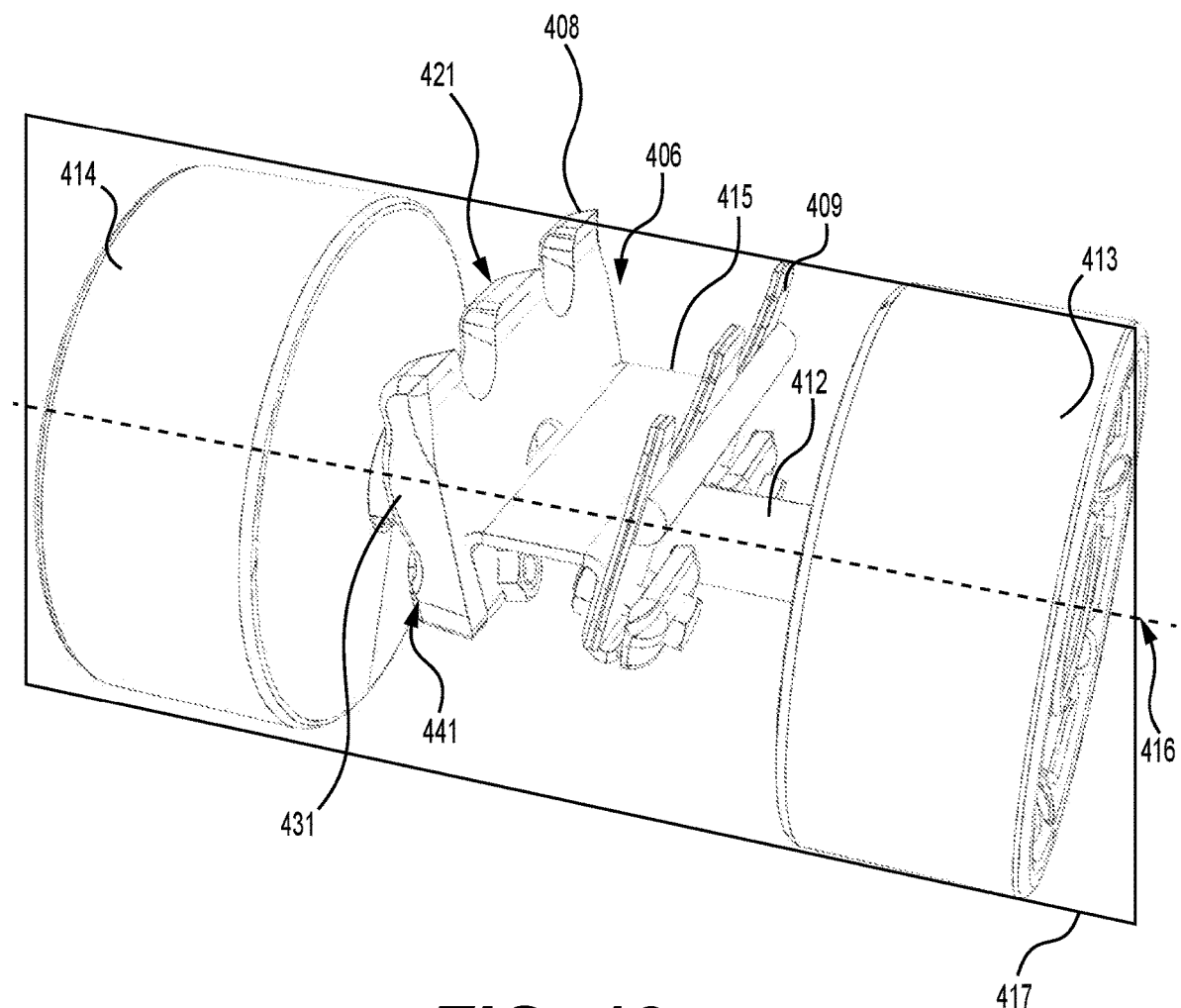
FIG. 19 is a perspective view taken from a top, front, left side of the right resilient body, the left reinforcing member, the axle linkage, the axle and the axle clamping assembly of FIG. 18.

Referring to FIGS. 18 and 19, the support structure 405 has the axle 412. The axle 412 is positioned below the frame member 78 such that the axle 412 is spaced from the frame member 78. The axle 412 has an axle axis 416 that extends generally transversally to the longitudinal center plane 56. Thus, the axle 412 also extends generally transversally to the longitudinal center plane 56. The axle 412 also has an axle plane 417. The axle plane 417 extends vertically, and contains the axle axis 416. The axle plane 417, which passes through the middle of the axle 412, defines a forward side and a rearward side of the axle 412. Given the resilient nature of the resilient assembly 406, it is contemplated that some range of motion in yaw (i.e. motion of the axle 412 about a vertically extending axis 411 shown in FIG. 17) could be allowed such that it is possible that the axle 412, the axle axis 416 and the axle plane 417 could be skewed from the longitudinal center plane 56.

The axle 412 has an axle linkage 415 connected at the center thereof. The axle linkage 415 extends in the longitudinal direction, and defines two leading apertures 418 and two trailing apertures 419.

A left support wheel 413 and a right support wheel 414 are rotatably connected to the axle 412. In the present embodiment, the left and right support wheels 413, 414 each have a diameter of 144 millimetres (5.67 in). It is contemplated that in other embodiments, the left and right support wheels 413m, 414 could be sized differently. For instance, the diameters could range from 129 millimetres (5.08 in) to 159 millimetres (6.26 in). It is contemplated that in some embodiments, there could be a support wheel bogie or a tandem support wheel assembly connected to the axle 412. It is contemplated that in such embodiments, the support wheel bogie or the tandem support wheel assembly could have two or more wheels connected thereto. It is also contemplated that in some embodiments, the support wheel bogie or the tandem support wheel assembly could be rotatable about the axle 412.

Referring now to FIGS. 19 to 22, the resilient assembly 406 has the left and right resilient bodies 407, 408. It is contemplated that in some embodiments, there could be more than two resilient bodies 407, 408. The left and right resilient bodies 407, 408 are connectable to the axle 412 and connectable to the frame member 78. In the present embodiment, as will be described below, the left and right resilient bodies 407, 408 are indirectly connected to the axle 412. In the present embodiment, the left resilient body 407 has a frame connecting portion 420, an intermediate portion 430 and an axle connecting portion 440, and the right resilient body 408 has a frame connecting portion 421, an intermediate portion 431 and an axle connecting portion 441. The left frame connecting portion 420, the intermediate portion 430 and the left axle connecting portion 430 are one integral body. Likewise, the frame connecting portion 421, the intermediate portion 431 and the axle connecting portion 441 are one integral body. As will be described in greater detail below, the left and right resilient bodies 407, 408 are substantially rigid, such that each of the left and right resilient bodies 407, 408 is capable of withstanding compressive forces. The left and right resilient bodies 407, 408 are also flexible, such that each of the left and right resilient bodies 407, 408 can resiliently deform. However, the left and right resilient bodies 407, 408 do not significantly extend when in tension. In the present embodiment, the left and right resilient bodies 407, 408 are made from a polymeric material. It is contemplated that the left and right resilient bodies 407, 408 could be made from another suitable resilient material. As will be described below, the left and right resilient bodies each have a reinforcing member 409, 410 (best seen in FIGS. 19 and 22). It is contemplated that in some embodiments, the left and right resilient bodies 407, 408 could have additional reinforcing members such as steel cords, fabrics, fibers, various layers, etc. incorporated thereto to modify the mechanical properties of the resilient bodies 407, 408.

Referring to FIGS. 17 to 22, the left and right resilient bodies 407, 408 will now be described in greater detail. The left resilient body 407 extends on the left side of the frame member 78, and the right resilient body 408 extends on the right side of the frame member 78. As the left and right resilient bodies 407, 408 are similar, only the left resilient body 407 will be described in detail herein.

The left resilient body 407 has the frame connecting portion 420, which is connectable to the frame member 78. The frame connecting portion 420 has a leading member 422, an intermediate member 423 and a trailing member 424. The leading member 422 has a protuberance 432, the intermediate member 423 has a protuberance 433 and the trailing member 424 has a protuberance 434. The protuberances 432, 433, 434 are adapted for engaging with the frame clamping assembly 470. The frame connecting portion 420 defines a recess 426 between the leading and intermediate members 422, 423, and a recess 427 between the intermediate and trailing members 423, 424. It is contemplated that in some embodiments, the recesses 426, 427 could be omitted, such that the leading, intermediate and trailing members 422, 423, 424 could be one member. It is also contemplated that there could be more or less than two recesses 426, 427. The frame connecting portion 420 has a connecting portion 428, extending from the frame connecting portion 420 toward the intermediate portion 430. In the present embodiment, the connecting portion 428 is more flexible than the rest of the frame connecting portion 420.

The left resilient body 407 also has the intermediate portion 430. The intermediate portion 430 extends between, and connects, the frame connecting portion 420 to the axle connecting portion 440. In the present embodiment, the intermediate portion 430 is more rigid than the frame and axle connecting portions 420, 440. The rigidity of the intermediate portion 430 can be selected depending on the requirements and objectives set by the designer of the support structure 405, and can be selected for example by changing the cross-sectional area between the frame and axle connecting portions 420, 430 and the intermediate portion 430.

The left resilient body 407 also has the axle connecting portion 440 which is connectable to the axle 412, and which includes a leading axle connecting member 442 and a trailing axle connecting member 443. The leading and trailing axle connecting portions 442, 443 are adapted to connect to the axle clamping assembly 490. The leading axle connecting member 442 defines an aperture 444 at a center thereof, and the trailing axle connecting member 443 defines an aperture 445 at a center thereof. The leading and trailing axle connecting members 443, 444 define a recess 446 therebetween. As will be described in greater detail below, the recess 446 is adapted to receive the axle 412 therein. The axle connecting portion 440 has a connecting portion 448 extending from the axle connecting portion 440 toward the intermediate portion 430. In the present embodiment, the connecting portion 448 is more flexible than the rest of the axle connecting portion 440. As will be described below, in the present embodiment, the apertures 444, 445 are configured to be coaxial to the leading and trailing apertures 418, 419 of the axle linkage 415.

Figure 20:
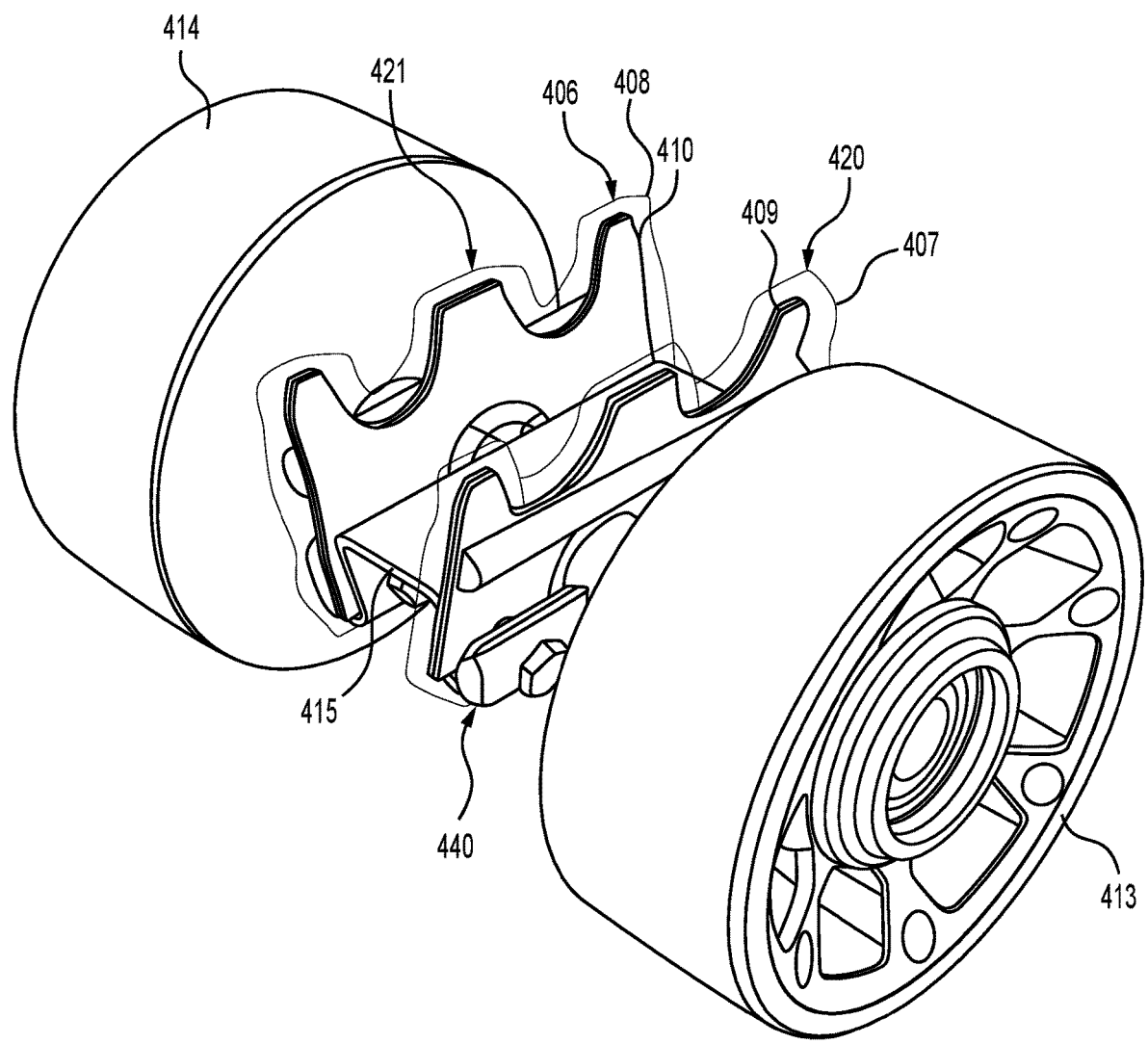
FIG. 20 is a perspective view taken from a top, front, left side of the left and right resilient bodies, the axle linkage, the axle and the axle clamping assembly of FIG. 18, with the left and right resilient bodies being shown in transparency.
Figure 21:
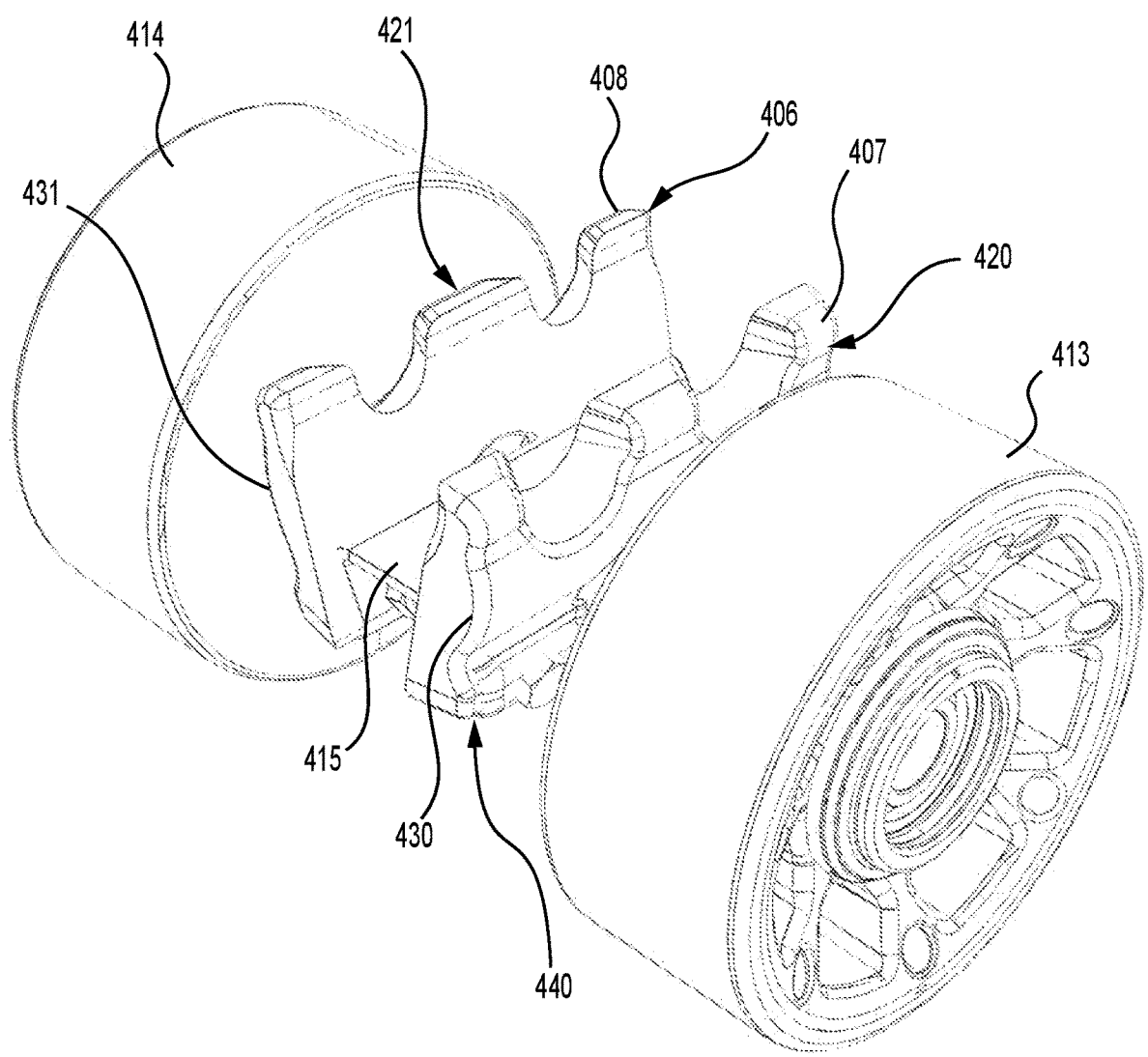
FIG. 21 is a perspective view taken from a top, front, left side of the left and right resilient bodies, the axle linkage, the axle and the axle clamping assembly of FIG. 18.
Figure 22:
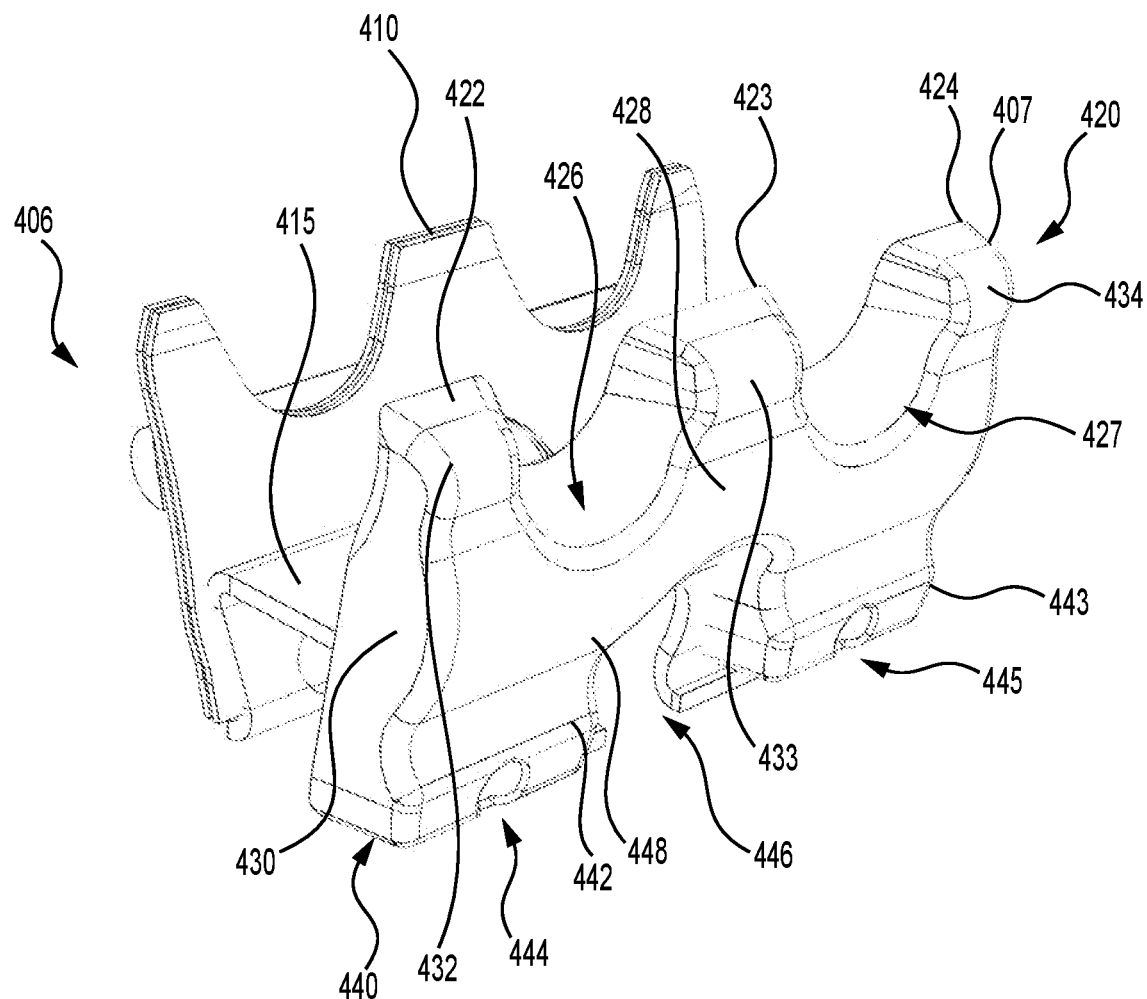
FIG. 22 is a perspective view taken from a top, front, left side of a right reinforcing member, the left resilient member and the axle linkage of the support structure of FIG. 17.

The left resilient member 407 has the reinforcing member 409 embedded therein (best seen in FIGS. 19 and 20). The reinforcing member 409 increases the rigidity of the left resilient member 407. The increased rigidity assists in reducing the amount of undesirable deformation of the left resilient member 407. For instance, the reinforcing member 409 reduces the deformation occurring between the forward and rearward ends of the left resilient member 407 due to torsional forces. In the present embodiment, the reinforcing member 409 is formed from fiberglass. It is contemplated that in other embodiments, the reinforcing member 409 could be formed from another suitable material.

Referring to FIG. 17, the frame clamping assembly 470, which is adapted to clamp the frame connecting portions 420, 421 to the frame member 78, will now be described. In the present embodiment, the frame clamping assembly 470 includes a left clamping member 472 and a right clamping member 473. It is contemplated that in some embodiments, there could be more or less than two clamping members 472, 473. As the left and right frame clamping members 472, 473 are similar, only the left frame clamping member 472 will be described in detail.

The frame clamping member 472 extends longitudinally along the left side of the frame member 78, and in the present embodiment, generally has the same longitudinal length as the frame connecting portion 420. The frame clamping member 472 has a leading receiving portion 482, an intermediate receiving portion 483 and a trailing receiving portion 484. The leading, intermediate and trailing receiving portions 482, 483, 484 are adapted to receive the leading, intermediate and trailing members 422, 423, 424. The frame clamping member 472 defines an aperture 486 between the leading and intermediate receiving portions 482, 483, and an aperture 487 between the intermediate and trailing portions 483, 484.

The frame clamping assembly 470 further includes four bolts 488a, 488b, 488c, 488d. It is contemplated that in some embodiments, there could be more or less than four bolts 488a, 488b, 488c, 488d. The bolts 488a, 488b, 488c, 488d connect the left and right frame clamping members 472, 473 and the frame connecting portions 420, 421 to the frame member 78. It is contemplated that in some embodiments, the left and right frame clamping members 472, 473 could be omitted such that the bolts 488a, 488b, 488c, 488d could directly clamp the frame connecting portions 420, 421 to the frame member 78. It is also contemplated that in some embodiments, the left and right frame clamping members 472, 473 could clamp the left and right frame connecting portions 420, 421 to the frame member 78 without the bolts 488a, 488b, 488c, 488d. It is contemplated that in some embodiments, the frame clamping assembly 470 could connect the frame connecting portions 420, 421 to the frame member 78 differently, such as by using an adhesive, bonding or snapping.

Still referring to FIG. 17, the axle clamping assembly 490, which is adapted for clamping the axle connecting portions 440, 441 to the axle 412, will now be described. In the present embodiment, the axle clamping assembly 490 includes a leading left clamping member 491, a trailing left clamping member 492, a leading right clamping member 493 and a trailing right clamping member 494. It is contemplated that in some embodiments, there could be more or less than four clamping members 491, 492, 493, 494. As the leading and trailing left and right axle clamping members 491, 492, 493, 494 are similar, only the leading and trailing left axle clamping members 491, 492 will be described in detail.

The leading left axle clamping member 491 generally has the same longitudinal length as the leading axle connecting member 442, and is adapted to be connected thereto. The leading left axle clamping member 491 defines an aperture 496 in a center thereof. Likewise, the trailing left axle clamping member 492 generally has the same longitudinal length as the trailing axle connecting member 443, and is adapted to be connected thereto. The trailing left axle clamping member 492 defines an aperture 497 in a center thereof.

The axle clamping assembly 490 also includes four bolts 500a, 500b, 500c, 500d and four nuts. The bolts 500a, 500b, 500c, 500d and the nuts connect the leading and trailing left and right axle clamping members 491, 492, 493, 494 and the axle connecting portions 440, 441 to the frame member 78. It is contemplated that in some embodiments, the leading and trailing left and right axle clamping members 491, 492, 493, 494 could be omitted such that the bolts 500a, 500b, 500c, 500d could directly clamp the axle connecting portions 440,441 to the axle 412. It is also contemplated that in some embodiments, the leading and trailing axle clamping members 491, 492, 493, 494 could clamp the axle connecting portions 440, 441 to the axle 412 without the bolts 500a, 500b, 500c, 500d. It is contemplated that in some embodiments, the axle clamping assembly 490 could connect the axle connecting portions 440, 441 to the axle 412 differently, such as by using an adhesive, bonding or snapping.

The support structure 405, as assembled, will now be described. The left and right resilient bodies 407, 408 are connected to the frame member 78 by the frame clamping assembly 470. More precisely, the left frame connecting portion 420 engages the left frame clamping member 472, such that the protuberance 432 of the leading member 422 is received in the leading receiving portion 482, the protuberance 433 of the intermediate member 423 is received in the intermediate receiving portion 483, and the protuberance 434 of the trailing member 424 is received in the trailing receiving portion 484. The bolt 488a is received in the leading aperture 486 of the left frame clamping member 472 and the leading aperture 402 of the frame member 78. A nut (not seen) is fastened to a portion of the bolt 488 extending through the leading apertures 402, 486, inside the frame member 78. The bolt 488b is received in the trailing aperture 487 of the left frame clamping member 472 and the trailing aperture 403 of the frame member 78. A nut (not seen) is fastened to a portion of the bolt 488 extending through the leading apertures 403, 487, inside the frame member 78.

The right resilient body 408 is connected to the frame member 78 likewise.

In the present embodiment, the left and right frame clamping members 472, 473 fully cover the area of the frame connecting portions 420, 421. It is contemplated that in some embodiments, the left and right frame clamping members 472, 473 could cover only partially the frame connecting portions 420, 421. As will be described in more detail below, when the left and right frame connecting portions 420, 421 undergo stress, the left and right frame clamping members 472, 473 could help spread stress throughout the frame connecting portions 420, 421. When the nuts are tightened, the left and right resilient bodies 407, 408 are connected to the frame member 78.

The left and right resilient bodies 407, 408 are connected to the axle 412 by the axle clamping assembly 490 and the axle linkage 415. The axle 412 is received in the recess 446, such that the axle linkage 415 is connectable to the left and right resilient bodies 407, 408. The leading and trailing left and right axle clamping members 491, 492, 493, 494 are connected to the axle connecting portions 440, 441 by the bolts 500a, 500b, 500c, 500d and the nuts.

More precisely, referring to the left resilient body 407, the bolt 500a is received in the aperture 496 of the leading left axle clamping member 491, in the leading aperture 444 of the leading axle connecting member 442 and in the leading aperture 418 of the axle linkage 415 A nut is fastened to a portion of the bolt 500a extending through the apertures 418, 444, 496. Likewise, the bolt 500b is received in the aperture 497 of the trailing left axle clamping member 492, in the trailing aperture 445 of the trailing axle connecting member 443 and in the trailing aperture 419 of the axle linkage 415. A nut is fastened to a portion of the bolt 500b extending through the apertures 419, 445, 497.

The right resilient body 408 is connected to the axle 412 likewise.

In the present embodiment, the leading and trailing left and right axle clamping members 491, 492, 493, 494 fully cover the area of the axle connecting portions 440, 441. It is contemplated that in some embodiments, the leading and trailing axle clamping members 492, 493 could only partially cover the axle connecting portions 440, 441. As will be described in more detail below, when the axle connecting portions 440, 441 undergo stress, the leading and trailing axle connecting portions 240, 241 could help spread stress throughout the leading and trailing axle connecting portions 240, 241. When the nuts are tightened, the left and right resilient bodies 407, 408 are connected to the axle 412.

Best seen in FIG. 18, the frame connecting portions 420, 421 of the left and right resilient bodies 407, 408 are laterally further from the longitudinal center plane 56 than the axle connecting 440, 441. As such, the left and right resilient bodies 407, 408 are at an angle to the longitudinal center plane 56.

Referring to FIG. 18, the resilient assembly 406 defines an imaginary pivot 520. More precisely, as the left and right resilient bodies 407, 408 are found at an angle with respect to the longitudinal center plane 56, left and right projections 550a, 550b of the left and right resilient bodies 407, 408 intersect. The point of intersection between the left and right projections 550a, 550b is the imaginary pivot 520.

As shown in FIG. 18, when the support structure 405 is in an initial position, the imaginary pivot 520 defines a pivot axis 522 that is laterally aligned with the longitudinal center plane 56. The pivot axis 522 is positioned below the axle axis 416, and extends generally parallel to the longitudinal center plane 56. Given the resilient nature of the left and right resilient bodies 407, 408, it is contemplated that the pivot axis 522 could be laterally offset from the longitudinal center plane 56. As briefly described above, and described in more detail below, maintaining the imaginary pivot 520 and the pivot axis 522 within the disclosed vertical range could help reduce wear of the endless track 90. Maintaining the imaginary pivot 520 and the pivot axis 522 within a certain lateral range, as described below, could also help reduce wear of the endless track 90.

As will be described below, the left and right resilient bodies 407, 408 are configured such that the imaginary pivot 520 and the pivot axis 522 are relatively stationary relative to the longitudinal center plane 56. However, it is contemplated that in some embodiments, the imaginary pivot 520 could move laterally.

Referring to FIG. 18, in the present embodiment, the imaginary pivot 520 and the pivot axis 522 are vertically aligned with the bottommost portion of the left and right support wheels 413, 414, which engage the inner surface 92 of the endless track 90. In other words, the pivot axis 522 is contained in a plane 524 defined by the bottommost portion of the left and right support wheels 413, 414. It is contemplated that in some embodiments, the imaginary pivot 520 and the pivot axis 522 could be vertically spaced upwardly from the plane 524 within about 25% of a distance between the axle axis 416 and the plane 524. As the vertical position of the imaginary pivot 520 increases, the support structure 405 becomes more unstable. In yet other embodiments, the imaginary pivot 520 and the pivot axis 522 could be vertically spaced downwardly from the plane 524, within 25% of the distance between the axle axis 416 and the plane 524. As the vertical position of the imaginary pivot 520 decreases, the imaginary pivot 520 is more likely to move laterally.

As will be elaborated below, the support structure 405 and the left and right resilient bodies 407, 408 are configured such that the axle 412 is pivotable about the pivot axis 522 within a range of motion of fifteen degrees in the clockwise or counter-clockwise directions. It is contemplated that in some embodiments, the range of motion could be less than fifteen degrees.

Though the left and right resilient bodies 407, 408 are flexible, the left and right resilient bodies 407, 408 are also sufficiently rigid such that the left and right resilient bodies 407, 408 can withstand some of the weight of the track system 52 and the vehicle 40. In the present embodiment, the connecting portions 428 are equally flexible to the connecting portions 448. It is contemplated that in some embodiments, the connecting portions 428 could be more or less flexible than the connecting portions 448. In the present embodiment, the connecting portions 428 and the connecting portions 448 are more flexible than the intermediate portions 430 of the left and right resilient bodies 407, 408. In the present embodiment, the frame connecting portions 420, 421 and the axle connecting portions 440, 441 are equally flexible. It is contemplated that in some embodiments, the frame connecting portions 420, 421 and the axle connecting portions 440, 441 could be more or less flexible than one another. In the present embodiment, when the resilient assembly 406, and thus the left and right resilient bodies 407, 408 deform, it is primarily the connecting portions 428 and the connecting portions 448 that deform.

In the present embodiment, when the left and right resilient bodies 407, 408 deform so that the axle 412 can pivot about the pivot axis 522, the pivot axis 522 remains stationary relative to the longitudinal center plane 56 of the track system 52. In some embodiments, however, given that the imaginary pivot 520 is defined by the left and right resilient bodies 407, 408, the imaginary pivot 520 and the pivot axis 522 could move laterally relative to the longitudinal center plane 56, as the left and right resilient bodies 407, 408 deform. In such embodiments, it is contemplated that the imaginary pivot 520 and the pivot axis 522 could move laterally by up to about three millimetres (0.12 in), when the axle 412 pivots about fifteen degrees about the pivot axis 522. In some track systems known in the prior art, the lateral displacement of a support structure that pivots fifteen degrees could reach about twelve millimetres (0.47 in). The larger the lateral displacement is, the more likely it is that the support wheels 413, 414 could come in contact with the lugs 94, thereby increasing wear.

Therefore, when the track system 52 encounters an obstacle, or uneven terrain, on either of its left and right sides, the support structure 405 is adapted to allow the support wheels 413, 414 and the endless track 90 to better conform to the obstacle or the uneven terrain. More precisely, the left and right resilient bodies 407, 408 deform such that the axle 412 can pivot about the pivot axis 522, allowing the left and right support wheels 413, 414 to pivot, while reducing the interference of the left and right support wheels 214, 215 with the lugs 94 and thus reducing wear of the endless track 90.

Description of the Pivoting Mechanism

Referring now to FIGS. 23a to 24c, the track system 52 and the support structure 405 will be described, as the track system 52 and the support structure 405 overcome obstacles of varying sizes.

Figure 23A:
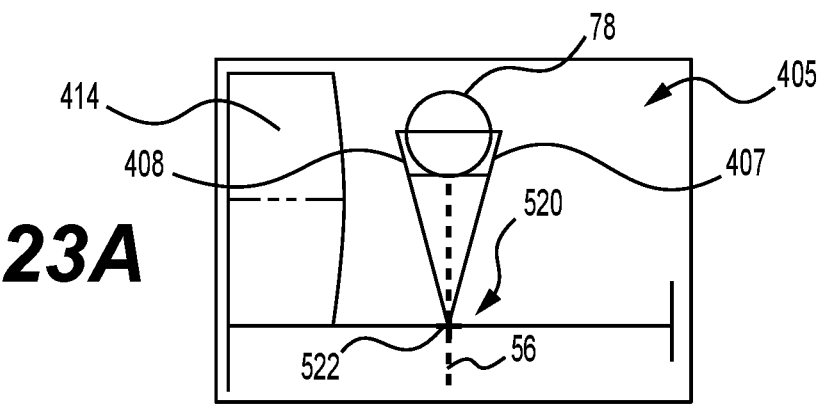
FIG. 23*a* is a schematic illustration of the support structure of FIG. 17 being at an initial position.

Referring to FIG. 23a, the support structure 405 is shown on a flat, level surface. As mentioned above, when the support structure 405 is positioned on a flat, level surface, the pivot axis 522 is vertically aligned with the inner surface 92 of the endless track 90, and laterally aligned with the longitudinal center plane 56. The support structure 405 is also in an initial position where the axle 412 is not pivoted about the pivot axis 522.

Figure 24A:
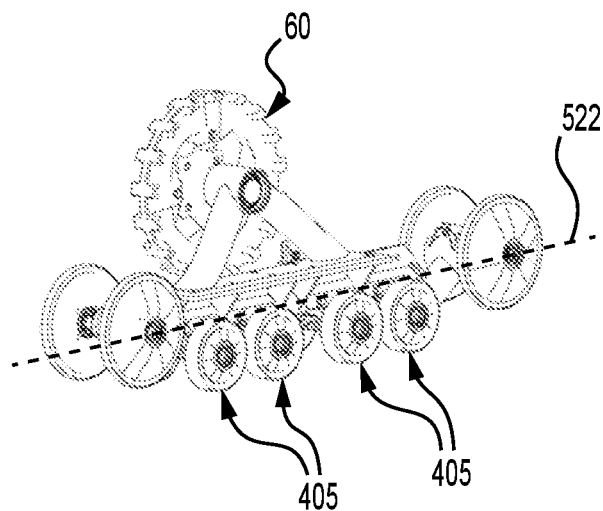
FIG. 24*a* is a perspective view taken from a top, front, left side of the track system of FIG. 16, with an endless track being omitted and the support structures of FIG. 17 being at an initial position.

Referring to FIG. 24a, the support structures 405 are shown positioned on a flat, level surface.

Figure 23B:
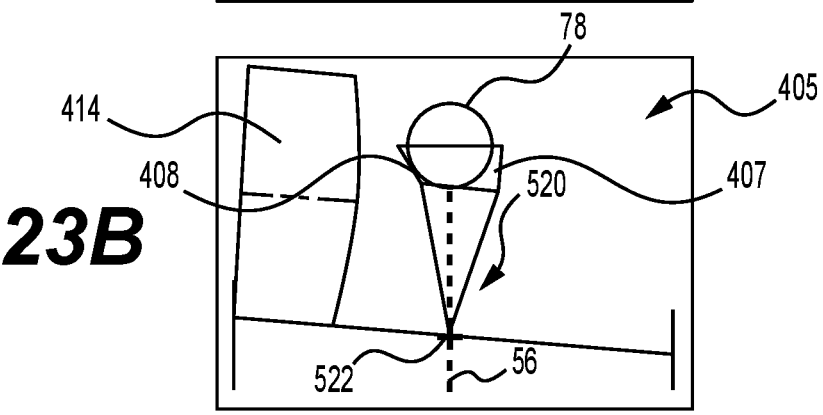
FIG. 23*b* is a schematic illustration of the support structure of FIG. 17 being pivoted at five degrees in a clockwise direction.

Referring to FIG. 23b, the support structure 405 has encountered an obstacle such that the right support wheel 414 is elevated with respect to the left support wheel 413. The left and right resilient bodies 407, 408 have deformed such that the axle 412 has pivoted about the pivot axis 522 by five degrees (in the clockwise direction in FIG. 23b), thereby allowing the right support wheel 414 and the corresponding portion of the endless track 90 to better conform to the obstacle. The left and right resilient bodies 407, 408 deforming induces stress therein. The frame and axle clamping members 472, 473, 491, 492, 493, 494 aid in distributing stress throughout the frame and axle connecting portions 420, 421, 440, 441. The imaginary pivot 520, and thus the pivot axis 522, is still laterally aligned with the longitudinal center plane 56. In other words, the pivot axis 522 is still contained in the longitudinal center plane 56.

Figure 23C:
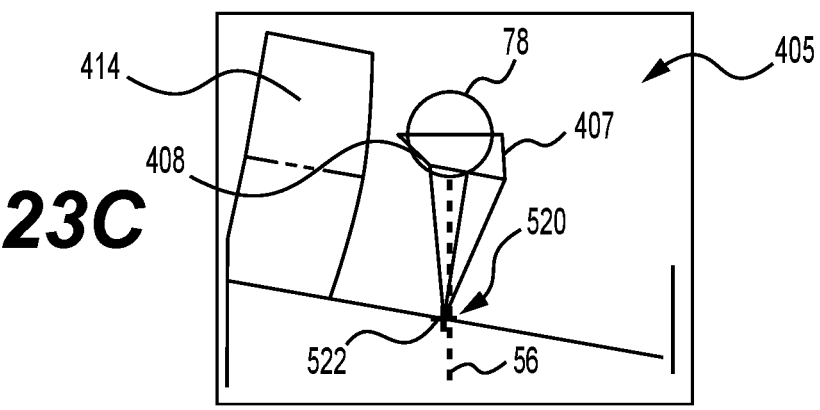
FIG. 23*c* is a schematic illustration of the support structure of FIG. 17 being pivoted at ten degrees in the clockwise direction.

Referring to FIG. 23c, the support structure 405 has encountered an obstacle such that the right support wheel 414 is elevated with respect to the left support wheel 413. The left and right resilient bodies 407, 408 have deformed such that the axle 412 has pivoted about the pivot axis 522 by ten degrees (in the clockwise direction in FIG. 23c), thereby allowing the right support wheel 414 and the corresponding portion of the endless track 90 to better conform to the obstacle. The left and right resilient bodies 407, 408 deforming induces stress therein. The frame and axle clamping members 472, 473, 491, 492, 493, 494 aid in distributing stress throughout the frame and axle connecting portions 420, 421, 440, 441. The imaginary pivot 520, and thus the pivot axis 522, has moved laterally to the right by one millimetre (0.039 in), such that the pivot axis 522 is no longer laterally aligned with the longitudinal center plane 56. It is contemplated that in some embodiments, the imaginary pivot 520, and thus the pivot axis 522, could move less than one millimetre (0.039 in). It is also contemplated that in some embodiments, the imaginary pivot 520, and thus the pivot axis 522, could still be aligned with the longitudinal center plane 56. In the present embodiment, the lateral movement does not cause the left and/or right support wheels 413, 414 to interfere with the lugs 94.

Figure 24B:
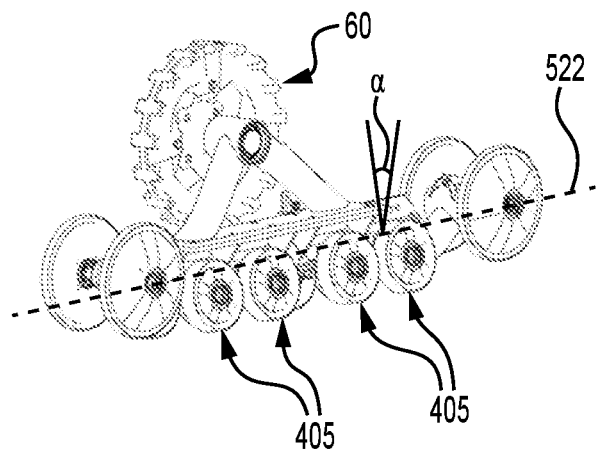
FIG. 24*b* is a perspective view taken from a top, front, left side of the track system of FIG. 16, with an endless track being omitted and the support structures of FIG. 17 being pivoted at ten degrees.

Referring to FIG. 24b, the support structures 405 have pivoted about the pivot axis 522 by ten degrees, in the counter-clockwise direction, shown by angle α.

Figure 23D:
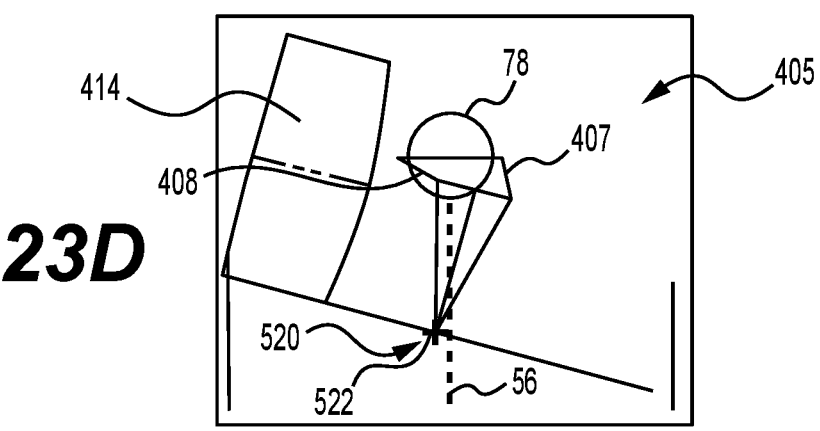
FIG. 23*d* is a schematic illustration of the support structure of FIG. 17 being pivoted at fifteen degrees in the clockwise direction.

Referring to FIG. 23d, the support structure 405 has encountered an obstacle such that the right support wheel 414 is elevated with respect to the left support wheel 413. The left and right resilient bodies 407, 408 have deformed such that the axle 412 has pivoted about the pivot axis 522 by fifteen degrees (in the clockwise direction in FIG. 23d), thereby allowing the right support wheel 414 and the corresponding portion of the endless track 90 to better conform to the obstacle. The left and right resilient bodies 407, 408 deforming induces stress therein. The frame and axle clamping members 472, 473, 491, 492, 493, 494 aid in distributing stress throughout the frame and axle connecting portions 420, 421, 440, 441. The imaginary pivot 520, and thus pivot axis 522, has moved laterally to the right by three millimetres (0.12 in), such that the imaginary pivot 520 is no longer aligned with the longitudinal center plane 56. It is contemplated that in some embodiments, the imaginary pivot 520, and thus the pivot axis 522, could move less than three millimetres (0.12 in). It is also contemplated that in some embodiments, the imaginary pivot 520, and thus the pivot axis 522, could still be laterally aligned with the longitudinal center plane 56. In the present embodiment, the lateral movement does not cause the left and/or right support wheels 413, 414 to interfere with the lugs 94.

Figure 24C:
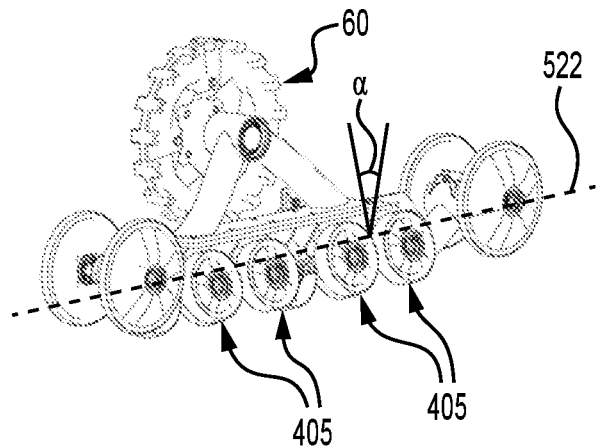
FIG. 24*c* is a perspective view taken from a top, front, left side of the track system of FIG. 16, with an endless track being omitted and the support structures of FIG. 17 being pivoted at fifteen degrees.

Referring to FIG. 24c, the support structures 405 have pivoted about the pivot axis 522 by fifteen degrees, in the counter-clockwise direction, shown by angle α.

As indicated above, reducing the lateral movement of the pivot axis 522 with respect to the longitudinal center plane 56 may assist in reducing wear of the lugs 94 in some conditions.

As described hereinabove, the present technology aids the track system 52 to better conform to uneven surfaces, which allows for better load distribution across the endless track 90, reduces wear on the lugs 94 and reduces chances of detracking.

In addition, when travelling over uneven terrain, the track system 52 is subject to vibrations and shocks. Due to the resilient nature of the left and right resilient bodies 407, 408, the support structure 405 acts as a damper. The support structure 405 can thus further improve the overall durability of the track system 52 by absorbing some vibrations.

Materials and Manufacturing

The various components of the track systems 50, 51, 52 are made of conventional materials (e.g. metals and metal alloys in most cases, such as steel) via conventional manufacturing processes (e.g. casting, molding, etc.). The present technology does not require any specific materials nor methods of manufacture. The present technology merely requires that each component be suitable for the purpose for which it is intended and the use to which it is to be put. Any material(s) or method(s) of manufacture which produce such components may be used in the present technology.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

The invention claimed is:

1. A support structure for connecting at least one support wheel assembly to a frame of a track system, the frame of the track system including a frame member, and the track system having a longitudinal center plane, the support structure comprising:
   an axle adapted for supporting the at least one support wheel assembly, the axle being vertically spaced from the frame member, the axle having an axle axis extending transversally to the longitudinal center plane, and having an axle plane extending vertically and containing the axle axis;
   a resilient assembly including at least one resilient body having:
      at least one frame connecting portion being configured to at least partially surround the frame member;
      at least one axle connecting portion being spaced from the at least one frame connecting portion, the at least one axle connecting portion being connectable to the axle; and
      at least one intermediate portion extending between the at least one frame connecting portion and the at least one axle connecting portion,
      a frame clamping assembly adapted for clamping the frame connecting portion to the frame member; and
      an axle clamping assembly adapted for clamping the axle connecting portion to the axle,
   the resilient assembly defining an imaginary pivot, the imaginary pivot defining a pivot axis being positioned below the axle axis, and the resilient assembly being deformable such that the axle is pivotable about the pivot axis.

2. The support structure of claim 1, wherein the pivot axis extends parallel to the longitudinal center plane.

3. The support structure of claim 1, wherein the pivot axis is vertically aligned with an inner surface of an endless track of the track system.

4. The support structure of claim 3, wherein the pivot axis is vertically spaced from the inner surface of the endless track within about 25% of a distance between the axle axis and the inner surface.

5. The support structure of claim 1, wherein the pivot axis is movable laterally relative to the longitudinal center plane by less than three millimeters.

6. The support structure of claim 1, wherein the axle is pivotable about the pivot axis within a range of motion ranging between about −15 and about +15 degrees.

7. The support structure of claim 1, wherein the resilient assembly includes a first resilient body and a second resilient body.

8. The support structure of claim 1, wherein the at least one frame connecting portion includes a first frame connecting portion and a second frame connecting portion,
   the frame clamping assembly includes a first frame clamping member adapted to clamp the first frame connecting portion to the frame member on a first side of the longitudinal center plane, and
   the frame clamping assembly further includes a second frame clamping member adapted to clamp the second frame connecting portion to the frame member on a second side of the longitudinal center plane.

9. The support structure of claim 8, wherein at least one of:
   the first frame clamping member covers at least a portion of the first frame connecting portion, and
   the second frame clamping member covers at least a portion of the second frame connecting portion.

10. The support structure of claim 1, wherein the at least one axle connecting portion includes a first axle connecting portion and a second axle connecting portion,
    the axle clamping assembly includes a first axle clamping member adapted to clamp the first axle connecting portion to the axle on a first side of the axle plane, and
    the axle clamping assembly further includes a second axle clamping member adapted to clamp the second axle connecting portion to the axle on a second side of the axle plane.

11. The support structure of claim 10, wherein at least one of:
    the first axle clamping member covers at least a portion of the first axle connecting portion, and
    the second axle clamping member covers at least a portion of the second axle connecting portion.

12. The support structure of claim 1, wherein the at least one frame connecting portion, the at least one intermediate portion and the at least one axle connecting portion are integral.

13. The support structure of claim 1, wherein the at least one axle connecting portion covers at least partially the axle.

14. A resilient assembly comprising:
    at least one resilient body for connecting an axle having an axle axis and a support wheel assembly to a frame member of a frame of a track system, the at least one resilient body comprising:
    at least one frame connecting portion being configured to at least partially surround the frame member;
    at least one axle connecting portion being spaced from the at least one frame connecting portion, the at least one axle connecting portion being connectable to the axle; and
    at least one intermediate portion extending between the at least one frame connecting portion and the at least one axle connecting portion, the resilient assembly defining an imaginary pivot, the imaginary pivot defining a pivot axis being positioned below the axle axis, and the resilient assembly being deformable such that the axle is pivotable about the pivot axis.

15. The resilient assembly of claim 14, wherein the at least one frame connecting portion includes a first frame connecting portion and a second frame connecting portion.

16. The resilient assembly of claim 14, wherein the at least one axle connecting portion includes a first axle connecting portion and a second axle connecting portion.

17. The resilient assembly of claim 14, wherein the at least one frame connecting portion, the at least one intermediate portion and the at least one axle connecting portion are integral.

18. The resilient assembly of claim 14, wherein the at least one axle connecting portion covers at least partially the axle.

19. The resilient assembly of claim 18, wherein the at least one resilient body includes a first resilient body and a second resilient body.

* * * * *